United States Patent
Baek et al.

(10) Patent No.: US 9,019,449 B2
(45) Date of Patent: Apr. 28, 2015

(54) LIQUID CRYSTAL LENS AND DISPLAY INCLUDING THE SAME

(75) Inventors: Jong-In Baek, Yongin (KR); Won-Sang Park, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 221 days.

(21) Appl. No.: 13/491,113

(22) Filed: Jun. 7, 2012

(65) Prior Publication Data

US 2012/0320288 A1 Dec. 20, 2012

(30) Foreign Application Priority Data

Jun. 15, 2011 (KR) .................. 10-2011-0058051

(51) Int. Cl.
*G02F 1/1333* (2006.01)
*G02F 1/29* (2006.01)
*G02F 1/1335* (2006.01)
*G02B 3/14* (2006.01)
*G02B 27/22* (2006.01)
*H04N 13/04* (2006.01)

(52) U.S. Cl.
CPC ............ *G02F 1/29* (2013.01); *G02F 1/133371* (2013.01); *G02F 1/133555* (2013.01); *G02B 3/14* (2013.01); *G02B 27/2214* (2013.01); *G02F 2001/294* (2013.01); *H04N 13/0404* (2013.01); *H04N 13/0406* (2013.01); *H04N 13/0422* (2013.01); *H04N 13/0454* (2013.01)

(58) Field of Classification Search
CPC ................... G02F 1/133555; G02F 1/133371

USPC ........................................................ 349/114
See application file for complete search history.

(56) References Cited

U.S. PATENT DOCUMENTS

| 6,295,107 | B1 | 9/2001 | Watanabe et al. |
| 6,859,333 | B1 | 2/2005 | Ren et al. |
| 2010/0181022 | A1 | 7/2010 | Zuidema |
| 2011/0109823 | A1 | 5/2011 | Galstian et al. |

FOREIGN PATENT DOCUMENTS

| KR | 1020060124143 A | 12/2006 |
| KR | 1020080105572 A | 12/2008 |
| KR | 1020090065934 A | 6/2009 |

OTHER PUBLICATIONS

European Search Report issued by EPO on Oct. 2, 2012, in connection with European Patent Application No. 12172158.3, which also claims Korean Patent Application No. 10-2011-0058051 as its priority document.

*Primary Examiner* — Phu Vu
(74) *Attorney, Agent, or Firm* — Robert E. Bushnell, Esq.

(57) ABSTRACT

A liquid crystal lens which controls an optical path and a display which includes the liquid crystal lens. The liquid crystal lens includes a first electrode and a second electrode facing each other, a liquid crystal layer interposed between the first electrode and the second electrode and having flat top and bottom surfaces, and a dielectric layer interposed between the second electrode and the liquid crystal layer. The dielectric layer includes a section in which capacitance between top and bottom surfaces of the dielectric layer changes along a horizontal direction.

40 Claims, 27 Drawing Sheets

LIQUID CRYSTAL LENS AND DISPLAY INCLUDING THE SAME

CLAIM OF PRIORITY

This application makes reference to, incorporates the same herein, and claims all benefits accruing under 35 U.S.C. §119 from an application earlier filed in the Korean Intellectual Property Office on the 15$^{th}$ of June, 2011 and there duly assigned Serial No. 10-2011-0058051.

BACKGROUND OF THE INVENTION

1. Field of the Invention

The present invention relates to a liquid crystal lens and a display including the same, and more particularly, to a liquid crystal lens which controls an optical path and a display including the liquid crystal lens.

2. Description of the Related Art

A display displays an image by emitting light using various methods. A light emission method used by a display often serves as a basis for determining the type of the display. Various researches are being competitively conducted on each light emission method in order to effectively control the luminance of emitted light and improve display quality.

Apart from research conducted to control the luminance of light, research into a stereoscopic image display which displays a three-dimensional (3D) image by controlling an optical path has recently been drawing a lot of attention. Such a stereoscopic image display is based on the principle that a viewer perceives a stereoscopic image when a left image is input to the viewer's left eye and a right image is input to the viewer's right eye. A polarized method (i.e., a glasses method), a time-division method, a parallax-barrier method (i.e., a glasses-free method), a lenticular or microlens method, and a blinking light method are mostly being researched.

Watching only 3D images for a long time could cause a viewer to feel dizzy. In addition, the viewer may want to watch not only 3D image contents but also two-dimensional (2D) image contents.

If an optical path can be controlled differently according to different operation mode, it is possible to display both 2D and 3D images. Controlling the optical path freely can have various light-based applications in addition to displays.

SUMMARY OF THE INVENTION

Aspects of the present invention provide an improved display.

Aspects of the present invention provide a liquid crystal lens which can control an optical path.

Aspects of the present invention also provide a display which can control an optical path.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a liquid crystal lens constructed with a first electrode and a second electrode facing each other, a liquid crystal layer interposed between the first electrode and the second electrode and having flat top and bottom surfaces, and a dielectric layer interposed between the second electrode and the liquid crystal layer. The dielectric layer includes a section in which capacitance between top and bottom surfaces of the dielectric layer changes along a horizontal direction.

According to another aspect of the present invention, there is provided a liquid crystal lens constructed with a first electrode and a second electrode facing each other, a liquid crystal layer interposed between the first electrode and the second electrode and having flat top and bottom surfaces, and a dielectric layer interposed between the second electrode and the liquid crystal layer and including a first sub-dielectric layer having a first dielectric constant and a second sub-dielectric layer having a second dielectric constant which is different from the first dielectric constant. The dielectric layer includes a section in which a height of at least one of the first sub-dielectric layer and the second sub-dielectric layer changes along a horizontal direction.

According to still another aspect of the present invention, there is provided a liquid crystal lens constructed with a first electrode, a liquid crystal layer formed on the first electrode and having flat top and bottom surfaces, a dielectric layer formed on the liquid crystal layer and having a top surface which includes a curved surface, and a second electrode conformally formed on the top surface of the dielectric layer.

According to still another aspect of the present invention, there is provided a display constructed with a light providing apparatus and a liquid crystal lens disposed on the light providing apparatus. The liquid crystal lens includes a first electrode and a second electrode facing each other, a liquid crystal layer interposed between the first electrode and the second electrode and having flat top and bottom surfaces, and a dielectric layer interposed between the second electrode and the liquid crystal layer. The dielectric layer includes a section in which capacitance between top and bottom surfaces of the dielectric layer changes along a horizontal direction.

According to still another aspect of the present invention, there is provided a display constructed with a light providing apparatus, and a liquid crystal lens disposed on the light providing apparatus. The liquid crystal lens includes a first electrode and a second electrode facing each other, a liquid crystal layer interposed between the first electrode and the second electrode and having flat top and bottom surfaces, and a dielectric layer interposed between the second electrode and the liquid crystal layer. The dielectric layer includes a first sub-dielectric layer having a first dielectric constant and a second sub-dielectric layer having a second dielectric constant which is different from the first dielectric constant. The dielectric layer includes a section in which the height of at least one of the first sub-dielectric layer and the second sub-dielectric layer changes along the horizontal direction.

According to still another aspect of the present invention, there is provided a display constructed with a light providing apparatus, and a liquid crystal lens disposed on the light providing lens. The liquid crystal lens includes a first electrode, a liquid crystal layer formed on the first electrode and having flat top and bottom surfaces, a dielectric layer formed on the liquid crystal layer and having a top surface which includes a curved surface, and a second electrode conformally formed on the top surface of the dielectric layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The term "elastance", as used herein, means the reciprocal of capacitance.

Liquid crystal lens and display according to the present invention will now be described more fully with reference to the accompanying drawings, in which exemplary embodiments of the invention are shown.

Figure 1:
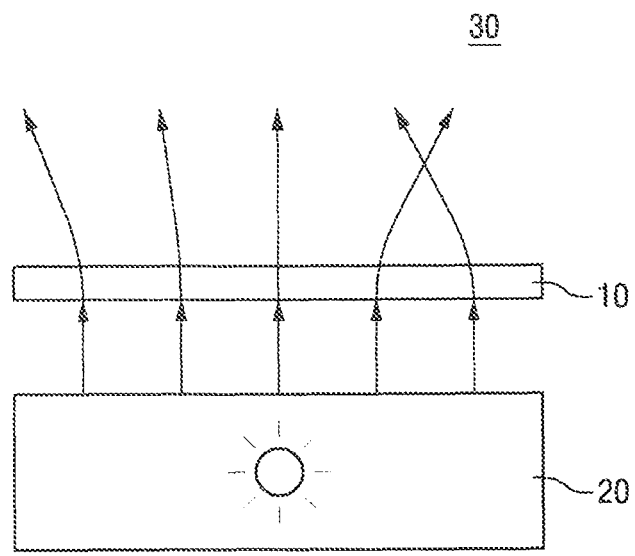
FIG. 1 is a schematic diagram illustrating the configuration of a display constructed as an exemplary embodiment according to the principles of the present invention.

FIG. 1 is a schematic diagram illustrating the configuration of a display 30 constructed as an exemplary embodiment according to the principles of the present invention. Referring to FIG. 1, the display 30 includes a light providing apparatus 20 and a liquid crystal lens 10 disposed on a side of the light providing apparatus 20.

The light providing apparatus 20 provides light to the liquid crystal lens 10. The light provided to the liquid crystal lens 10 by the light providing apparatus 20 may include light emitted from the light providing apparatus 20 and/or light incident from the liquid crystal lens 10 and reflected by the light providing apparatus 20.

The light providing apparatus 20 may include a display panel. In some embodiments, the display panel may be a self-luminous display panel such as an organic light-emitting diode (OLED), a light-emitting diode (LED), an inorganic electroluminescent display (EL), a field emission display (FED), a surface-conduction electron-emitter display (SED), a plasma display panel (PDP), or a cathode ray tube (CRT). In some other embodiments, the display panel may be a non-luminous display panel such as a liquid crystal display (LCD) or an electrophoretic display (EPD). When the display panel is a non-luminous display panel, it may further include a light source such as a backlight assembly.

The liquid crystal lens 10 is disposed on a side of the light providing apparatus 20 and receives light from the light providing apparatus 10. The liquid crystal lens 10 at least partially modulates characteristics (such as the path or phase) of the incident light. In some embodiments, the liquid crystal lens 10 may modulate characteristics of the incident light differently according to different mode. For example, the liquid crystal lens 10 may not modulate characteristics of the incident light in a first mode but may modulate characteristics of the incident light in a second mode. Modulating light characteristics differently according to different mode may lead to modulating an image output from the display panel of the light providing apparatus 20 differently according to the different mode. Accordingly, the image output from the display panel can be controlled differently according to different mode by the liquid crystal lens 10. Such selective modulation of light characteristics according to different mode by the liquid crystal lens 10 makes it possible to realize a two-dimensional (2D)/three-dimensional (3D) switchable display, as will be described later.

Figure 2:
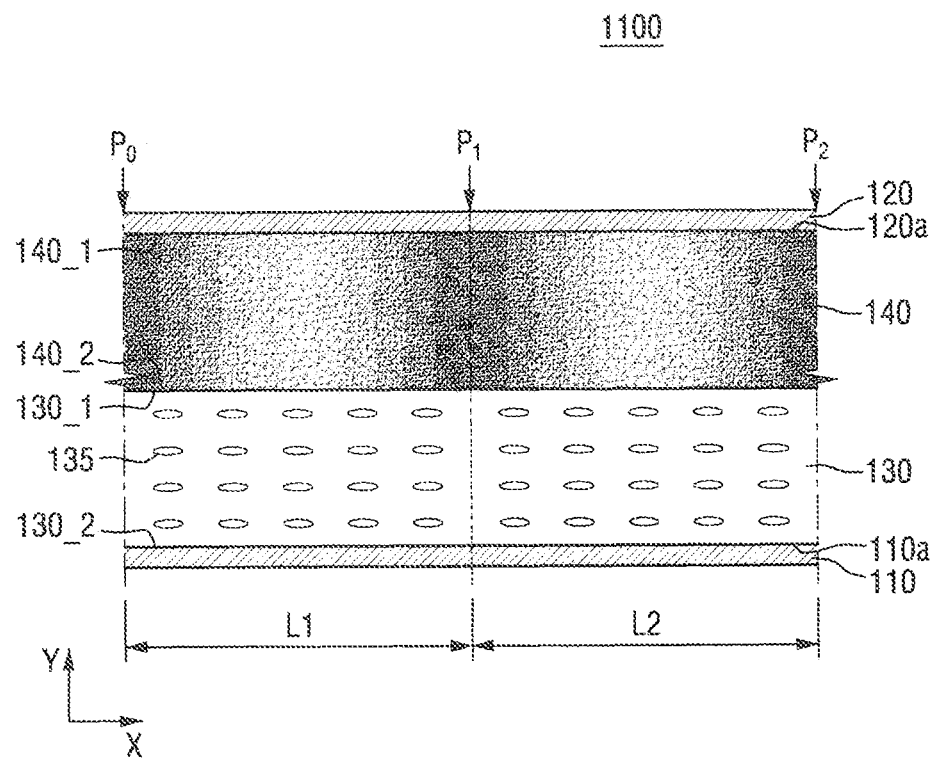
FIG. 2 is a cross-sectional view of a liquid crystal lens constructed as an exemplary embodiment according to the principles of the present invention.

Hereinafter, a liquid crystal lens constructed as an exemplary embodiment according to the principles of the present invention will be described in greater detail. FIG. 2 is a cross-sectional view of a liquid crystal lens 1100 constructed as an exemplary embodiment according to the principles of the present invention. Referring to FIG. 2, the liquid crystal lens 1100 includes a first electrode 110 and a second electrode 120 which face each other and a liquid crystal layer 130 and a dielectric layer 140 which are interposed between the first electrode 110 and the second electrode 120.

Each of the first electrode 110 and the second electrode 120 may be made of a transparent conductive material. For example, each of the first electrode 110 and the second electrode 120 may be made of oxide such as indium tin oxide (ITO), indium zinc oxide (IZO), zinc oxide (ZO), indium Oxide (IO), or titanium oxide (TiO). In another example, each of the first electrode 110 and the second electrode 120 may contain a material such as carbon nanotubes (CNTs), metal nanowires, or conductive polymer. The first electrode 110 and the second electrode 120 may not necessarily be made of the same material.

A first voltage is applied to the first electrode 110, and a second voltage is applied to the second electrode 120. Therefore, an electric field corresponding to a difference between the first voltage and the second voltage may be formed between a top surface 110a of the first electrode 110 and a bottom surface 120a of the second electrode 120.

In some embodiments according to the principles of the present invention, each of the first electrode 110 and the second electrode 120 may be an unpatterned, whole-surface electrode. The first electrode 110 and the second electrode 120 may be placed parallel to each other.

The liquid crystal layer 130 and the dielectric layer 140 are interposed between the first electrode 110 and the second electrode 120. In FIG. 2, the liquid crystal layer 130 is stacked on the first electrode 110, and the dielectric layer 140 is stacked on the liquid crystal layer 130. The order in which the liquid crystal layer 130 and the dielectric layer 140 are stacked, however, can be reversed.

A top surface 130_1 and a bottom surface 130_2 of the liquid crystal layer 130 may be substantially flat. The flat top and bottom surfaces 130_1 and 130_2 of the liquid crystal layer 130 may contribute to uniform distribution of liquid crystal molecules 135. Further, the top surface 130_1 and the bottom surface 130_2 of the liquid crystal layer 130 may be parallel to each other.

In a space defined by the top surface 130_1 and the bottom surface 1302, the liquid crystal layer 130 includes the liquid crystal molecules 135. The liquid crystal molecules 135 may be distributed with a uniform density over the entire region of the liquid crystal layer 130. In the current exemplary embodiment, the liquid crystal molecules 135 have positive dielectric anisotropy and are initially aligned in a horizontal direction. When the liquid crystal molecules 135 are initially aligned in the horizontal direction, a long axis of the liquid crystal molecules 135 is parallel to the horizontal direction. In this state, the liquid crystal molecules 135 may have an azimuth of, e.g., 0 degrees. In the present specification, an azimuth is an angular measurement in a spherical coordinate system. The vector from an observer (origin) to a point of interest is projected perpendicularly onto a reference plane; the angle between the projected vector and a reference vector on the reference plane is called the azimuth. In addition, the liquid crystal molecules having positive dielectric anisotropy will align parallel with an applied electric field; and the liquid crystal molecules having negative dielectric anisotropy will align perpendicular to an applied electric field.

In some other embodiments according to the principles of the present invention, the liquid crystal molecules 135 may have negative dielectric anisotropy. In this case, the liquid crystal molecules 135 may initially be aligned in a vertical direction. When the liquid crystal molecules 135 are initially aligned in the vertical direction, they not only have an azimuth of 90 degrees but also are prattled at a certain angle. From this perspective, the azimuth of the liquid crystal molecules 135 initially aligned in the vertical direction may be, for example, 80 to 90 degrees.

The dielectric layer 140 includes one or more dielectric materials. Assuming that a horizontal direction of the liquid crystal lens 1100 is a first direction X and that a thickness direction perpendicular to the first direction X, that is, a direction in which the liquid crystal layer 130 and the dielectric layer 140 are stacked is a second direction Y, capacitance between a top surface 140_1 and a bottom surface 140_2 of the dielectric layer 140 may at least partially differ from position to position along the first direction X. That is, the dielectric layer 140 includes sections in which the capacitance between the top surface 140_1 and the bottom surface 140_2 of the dielectric layer 140 changes along the first direction X. If a distance between the top surface 140_1 and the bottom surface 140_2 of the dielectric layer 140 is maintained constant along the first direction X, for example, if the top surface 140_1 and the bottom surface 140_2 of the dielectric layer 140 are flat and parallel to each other, a different capacitance at each position may be achieved by a different dielectric constant at each position.

The liquid crystal lens 1100 may include two or more unit lens sections, e.g., first and second unit lens sections L1 and L2 according to the distribution of capacitance or dielectric constant of the dielectric layer 140. Each of the first and second unit lens sections L1 and L2 may exhibit optical characteristics similar to those of an optical lens, such as a convex lens or a concave lens, according to voltages applied to the first electrode 110 and the second electrode 120. The optical characteristics of each of the first and second unit lens sections L1 and L2 may vary according to the voltages applied to the first electrode 110 and the second electrode 120. That is, each of the first and second unit lens sections L1 and L2 may function as a variable lens.

A single optical lens can be understood as exhibiting modulation characteristics of a single ray of light. For example, rays of light incident on a surface of a convex lens are refracted differently according to positions at which the rays of light are incident. However, the convex lens may collect, e.g., concentrate the rays of light into a single ray of light and modulate the single ray of light. From this perspective, each of the first and second unit lens sections L1 and L2 of the liquid crystal lens 1100 may have light modulation characteristics corresponding to those of an optical lens. That is, the first unit lens section L1 may exhibit first light modulation characteristics, and the second unit lens section L2 may exhibit second light modulation characteristics. The first light modulation characteristics may be substantially the same as the second light modulation characteristics. For example, both the first light modulation characteristics and the second light modulation characteristics may be optical characteristics of a convex lens. In this case, the first unit lens section L1 and the second unit lens section L2 may operate as if two optically identical convex lenses were arranged.

The light modulation characteristics of each of the first and second unit lens sections L1 and L2 will be described in detail with reference not only to FIG. 2 but also to FIGS. 3A through 7.

Figure 3A:
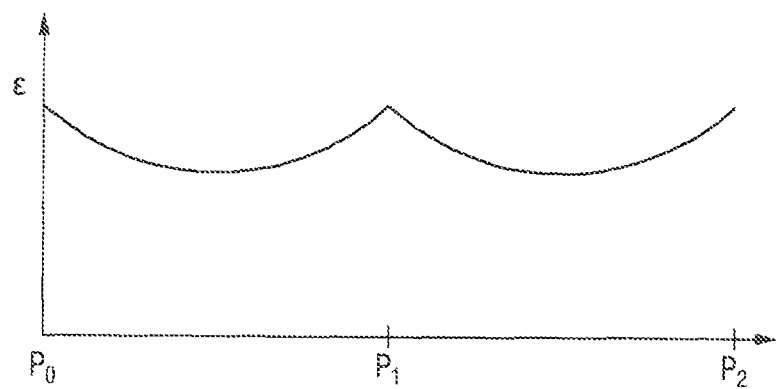
FIG. 3A is a graph illustrating the dielectric constant of a dielectric layer of FIG. 2 at each horizontal position.
Figure 3B:
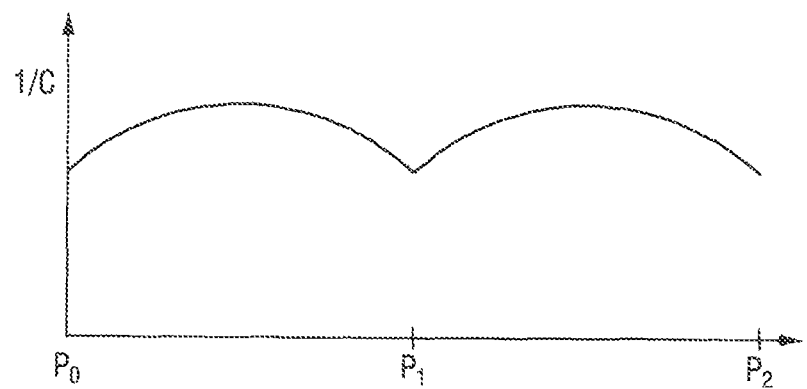
FIG. 3B is a graph illustrating the elastance of a dielectric layer of FIG. 2 at each horizontal position.

FIG. 3A is a graph illustrating the dielectric constant of the dielectric layer 140 of FIG. 2 at each horizontal position. FIG. 3B is a graph illustrating the elastance of a dielectric layer of FIG. 2 at each horizontal position. Referring to FIGS. 2 and 3A, the dielectric constant of the dielectric layer 140 in the first unit lens section L1 increases and then decreases in a direction from a position P0 to a position P1. That is, the dielectric constant forms a parabolic curve that bulges upward. In the second unit lens section L2, the dielectric constant of the dielectric layer 140 also increases and then decreases in a direction from the position P1 to a position P2. That is, the dielectric constant forms a parabolic curve that bulges upward. The parabolic curve of the first unit lens section L1 may be identical to that of the second unit lens section L2. That is, the dielectric constant in the first unit section L1 may be equal to the dielectric constant in the second unit section L2 at the corresponding position along the horizontal direction. Therefore, the first unit lens section L1 and the second unit lens section L2 constructed as the current exemplary embodiment may exhibit substantially the same electrical and optical properties. If the distance between the top surface 140_1 and the bottom surface 140_2 of the dielectric layer 140 is constant along the first direction X, since the capacitance is proportional to the dielectric constant, a graph of the capacitance of the dielectric layer 140 at each horizontal position may show substantially the same pattern as the graph of FIG. 3A. Therefore, a graph of the elastance 1/C, which is the reciprocal of capacitance C, of the dielectric layer 140 may have similar patterns to the horizontal symmetry of the graph of the dielectric constant, as shown in FIG. 3B. Therefore, the elastance 1/C may be highest in the flat section where the dielectric constant is lowest. The capacitance C or elastance 1/C in the first unit section L1 may be the same as the capacitance C or elastance 1/C in the second unit section L2 at the corresponding position along the horizontal direction, when the dielectric constant in the first unit section is the same as the dielectric constant in the second unit section at the corresponding position along the horizontal direction.

Figure 4:
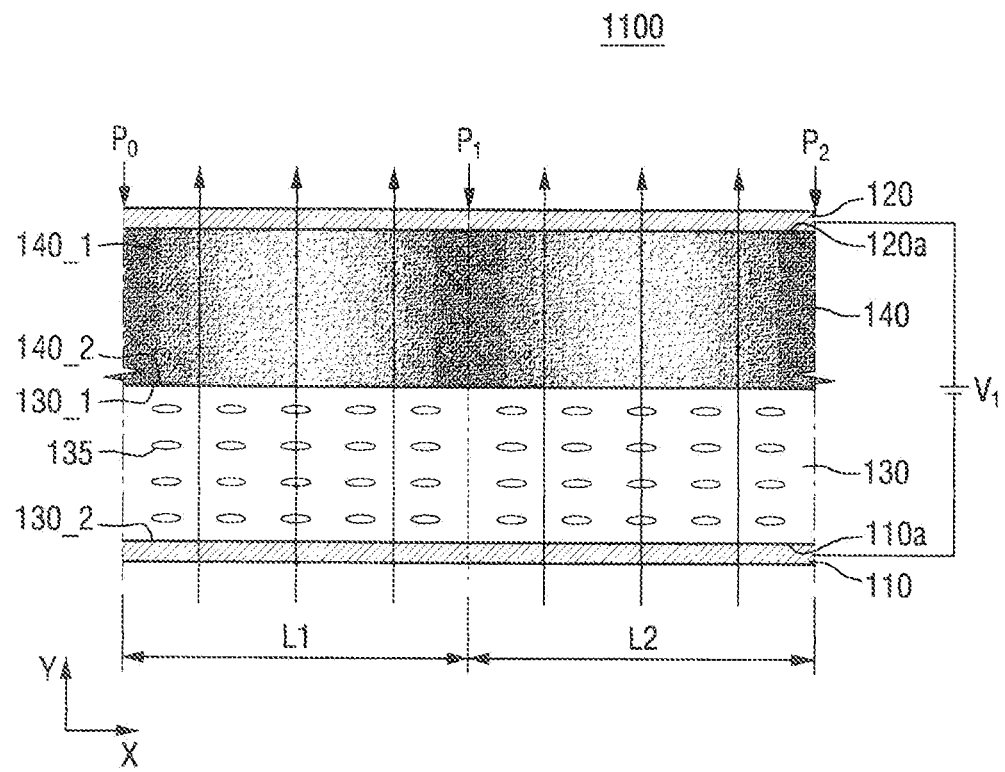
FIG. 4 is a schematic diagram illustrating the operation of the liquid crystal lens of FIG. 2 in a first mode.
Figure 5:
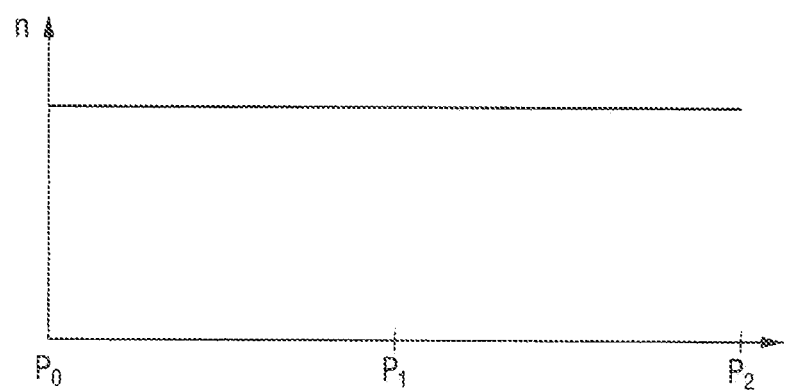
FIG. 5 is a graph illustrating the refractive index of a liquid crystal layer at each horizontal position when the liquid crystal lens of FIG. 2 is operating in the first mode.

The operation of the liquid crystal lens 1100 configured as described above will now be described. FIG. 4 is a schematic diagram illustrating the operation of the liquid crystal lens 1100 of FIG. 2 in a first mode. FIG. 5 is a graph illustrating the refractive index of the liquid crystal layer 130 at each horizontal position when the liquid crystal lens 1100 of FIG. 2 is in the first mode.

Referring to FIGS. 4 and 5, when the liquid crystal lens 1100 is operating in the first mode, the liquid crystal molecules 135 of the liquid crystal layer 130 are arranged at the same azimuth, irrespective of positions in the first direction X, i.e., the horizontal direction. For example, the first mode may be realized by applying the same voltage to the first electrode 110 and the second electrode 120. When the same voltage is applied to the first electrode 110 and the second electrode 120, a potential difference V1 applied to the dielectric layer 140 and the liquid crystal layer 130 is 0 V. Since no voltage is applied to the liquid crystal layer 130, the liquid crystal molecules 135 remain aligned in the horizontal direction which is the initial alignment direction. Therefore, as shown in FIG. 5, light incident on the liquid crystal lens 1100 feels the same refractive index irrespective of positions in the horizontal direction of the liquid crystal layer 130. Accordingly, the light incident on the liquid crystal layer 130 propagates straight within the liquid crystal layer 130 without changing its path.

When the light that passes through the liquid crystal layer 130 reaches the dielectric layer 140, if the refractive index of the dielectric layer 140 is the same as that of the liquid crystal layer 130, the light does not perceive the dielectric layer 140 as an optically different material. Therefore, the light propagates through the dielectric layer 140 without changing its path. Even when the refractive index of the liquid crystal layer 130 is different from that of the dielectric layer 140, most light that transmits through the liquid crystal layer 130 vertically does not change its path. The light simply changes its wavelength at an interface between the liquid crystal layer 130 and the dielectric layer 140 having different refractive indices.

Even when the dielectric layer 140 is made of two or more materials, if each material has the same refractive index, light propagates through the interfaces between the different materials without changing its path. Further, even when the dielectric layer 140 is made of two or more materials, each having the different refractive index, if light is vertically incident on an interface between the materials, its path does not change. As shown in FIG. 4, light incident on the liquid crystal lens 1100 passes through the liquid crystal layer 130 and the dielectric layer 140 without changing its path.

Figure 6:
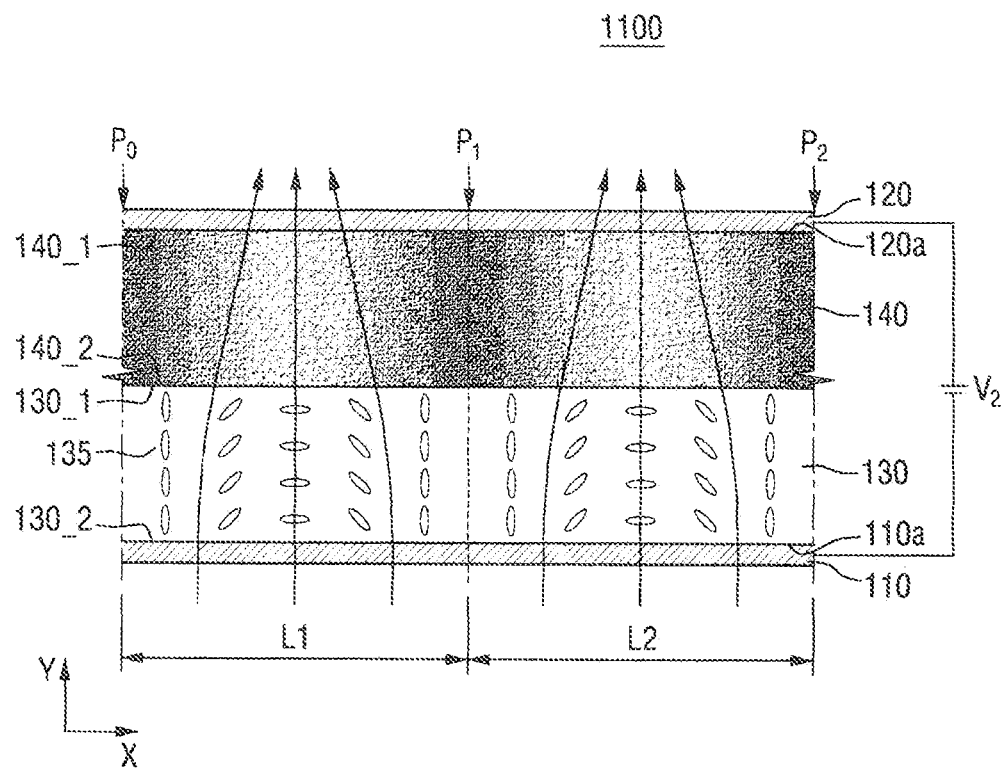
FIG. 6 is a schematic diagram illustrating the operation of the liquid crystal lens of FIG. 2 in a second mode.
Figure 7:
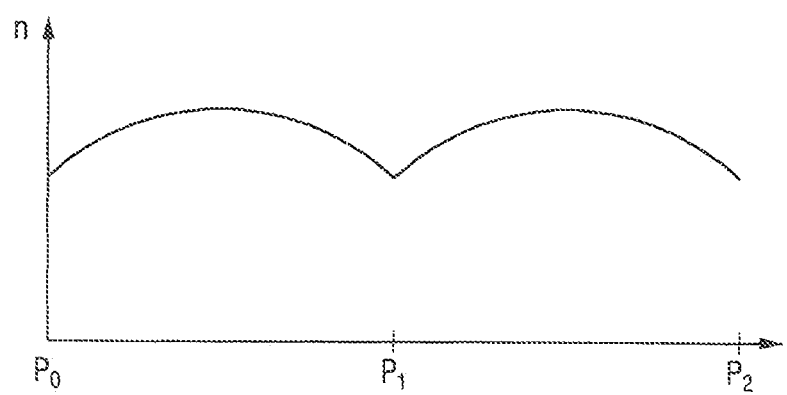
FIG. 7 is a graph illustrating the refractive index of the liquid crystal layer at each horizontal position when the liquid crystal lens of FIG. 2 is operating in the second mode.

FIG. 6 is a schematic diagram illustrating the operation of the liquid crystal lens 1100 of FIG. 2 in a second mode. FIG. 7 is a graph illustrating the refractive index of the liquid crystal layer 130 at each horizontal position when the liquid crystal lens 1100 of FIG. 2 is in the second mode.

Referring to FIGS. 6 and 7, when the liquid crystal lens 1100 is operating in the second mode, the liquid crystal molecules 135 of the liquid crystal layer 130 are arranged to have different azimuths at least some horizontal positions. For example, the second mode may be realized by applying different voltages to the first electrode 110 and the second electrode 120 and forming an electric field between the first electrode 110 and the second electrode 120. In the second mode, the electric field between the top surface 110a of the first electrode 110 and the bottom surface 120a of the second electrode 120 remains constant at each horizontal position. However, from the perspective of the liquid crystal layer 130, the electric field between the top surface 130_1 and the bottom surface 130_2 varies at each horizontal position.

More specifically, the liquid crystal layer 130 and the dielectric layer 140 are interposed between the first electrode 110 and the second electrode 120. Since the bottom surface 130_2 of the liquid crystal layer 130 is adjacent to the first electrode 110, the first voltage may be applied to the bottom surface 130_2, irrespective of positions in the horizontal direction. In addition, the liquid crystal layer 130 is interposed between the top surface 130_1 of the liquid crystal layer 130 and the first electrode 110, and the dielectric layer 140 is interposed between the top surface 130_1 of the liquid crystal layer 130 and the second electrode 120. The first capacitor having the first capacitance is formed between the top surface 130_1 and the bottom surface 130_2 of the liquid crystal layer 130. The second capacitor having the second capacitance is formed between the top surface 140_1 and the bottom surface 140_2 of the dielectric layer 140. The first capacitor is connected to the second capacitor in series on the equivalent circuit. Voltages applied to a plurality of capacitors in series are in inverse proportion to the capacitance of the respective capacitor and in proportion to the elastance of the respective capacitor.

Thus, a voltage between the first voltage applied to the first electrode 110 and the second voltage applied to the second electrode 120 may be applied to the top surface 130_1 of the liquid crystal layer 130, that is the bottom surface 140_2 of the dielectric layer 140. Here, when the capacitance of the dielectric layer 140 is high, the difference between the voltage applied to the top surface 140_1 and the voltage applied to the bottom surface 140_2 of the dielectric layer 140 may be relatively small. Thus, the difference between the first voltage and the voltage applied to the top surface 130_1 of the liquid crystal layer 130 may be relatively large. When the capacitance of the dielectric layer 140 is low, the difference between the first voltage and the voltage applied to the top surface 130_1 of the liquid crystal layer 130 may be relatively small.

As described above with reference to FIGS. 3A and 3B, the dielectric constant and capacitance of the dielectric layer 140 change along the horizontal direction. Thus, the voltage applied to the top surface 130_1 of the liquid crystal layer 130 also changes along the horizontal direction. In a section in which the dielectric layer 140 has a high dielectric constant (high capacitance), a voltage relatively greatly different from the first voltage is applied to the top surface 130_1. That is, the magnitude of the electric field applied to the top and bottom surfaces 130_1 and 130_2 of the liquid crystal layer 130 increases. In a section in which the dielectric layer 140 has a low dielectric constant (low capacitance), a voltage relatively little different from the first voltage is applied to the top surface 130_1. Therefore, the magnitude of the electric field applied to the top and bottom surfaces 130_1 and 130_2 of the liquid crystal layer 130 decreases.

As described above, since the liquid crystal molecules 135 have positive dielectric anisotropy in the current exemplary embodiment, a larger electric field causes the liquid crystal molecules 135 to be rotated more in the direction of the electric field. Therefore, as shown in FIG. 6, the liquid crystal molecules 135 are vertically rotated more in a section in which the dielectric constant of the dielectric layer 140 is low and are rotated relatively less in a section in which the dielectric constant of the dielectric layer 140 is high.

The liquid crystal molecules 135 also have anisotropy for refractive index. That is, the liquid crystal molecules 135 have two types of refractive indices, i.e., an ordinary ray refractive index no for light in an optically long-axis direction and an extraordinary ray refractive index ne for light in a short-axis direction. Here, the ordinary ray refractive index no may be smaller than the extraordinary ray refractive index ne. For example, the ordinary ray refractive index no of the liquid crystal molecules 135 may be about 1.5, and the extraordinary ray refractive index ne of the liquid crystal molecules 135 may be about 1.7.

Therefore, when the liquid crystal molecules 135 are arranged horizontally, light feels the extraordinary ray refractive index ne, and thus the refractive index becomes relatively high. On the other hand, when the liquid crystal molecules 135 are rotated vertically, light feels a relatively smaller ordinary ray refractive index no, and thus the refractive index becomes relatively lower. Therefore, the refractive index of the liquid crystal layer 135 at each position in the first direction X may be distributed as shown in FIG. 7. Referring to FIGS. 7 and 3A, the graph of the refractive index shows substantially the same pattern as the elastance, the reciprocal of capacitance. Therefore, the refractive index may be highest at the point in which capacitance is lowest.

Light propagates straight within a medium having a uniform refractive index. However, in a gradient index (GRIN) lens structure in which the refractive index gradually changes within a medium as shown in FIG. 7, the path of light bends from a medium having a low refractive index to a medium having a high refractive index. The structure and operating principle of the GRIN lens are disclosed in U.S. Pat. No. 5,790,314, the content of which is incorporated and claimed in the present application.

In the second mode, the path of light that passes through the liquid crystal layer 130 bends toward a medium having a high refractive index as shown in FIG. 6. The modulated path of light shown in FIG. 6 is similar to the path of light that passes through a convex lens. That is, in the second mode, the liquid crystal layer 130 of the liquid crystal lens 1100 can concentrate light without using a convex lens.

Light that passes through the liquid crystal layer 130 reaches an interface of the dielectric layer 140 and the liquid crystal layer 130. Since the light is bent as it passes through the liquid crystal layer 130, it enters the dielectric layer 140 at a certain angle of incidence. When the dielectric layer 140 has substantially the same refractive index as the liquid crystal layer 130, the light propagates without changing its path. When the dielectric layer 140 and the liquid crystal layer 130 have different refractive indices, the light is refracted at the interface. If the refractive index of the dielectric layer 140 is lower than that of the liquid crystal layer 130, the light may be refracted at a greater angle than the angle of incidence according to Snell's law and thus be brought to a focus in a shorter distance. Conversely, if the refractive index of the dielectric layer 140 is higher than that of the liquid crystal layer 130, the opposite is obvious.

The magnitudes of the first voltage and the second voltage not only determine the first mode or the second mode but also control light modulation characteristics differently even in the same second mode. As described above, when the same voltage is applied to the first electrode 110 and the second electrode 120, the liquid crystal lens 110 is driven in the first mode. Even when the difference between the first voltage and the second voltage is very large, the liquid crystal lens 1100 may be driven in the first mode. In an extreme example, if the difference between the first voltage and the second voltage is infinite, even when the voltage applied to the top surface 130_1 of the liquid crystal layer 130 differs from position to position in the horizontal direction, since an absolute value of the difference between the voltage of the top surface 130_1 of the liquid crystal layer 130 and the voltage of the bottom surface 130_2 of the liquid crystal layer 130 is very large, all of the liquid crystal molecules 135 may rotate vertically. That is, since all liquid crystal molecules 135 of the liquid crystal layer 130 have the same azimuth of 90 degrees, the light that passes through the liquid crystal layer 130 may feel the ordinary ray refractive index no, irrespective of positions in the horizontal direction. In this case, the GRIN lens is not formed, and thus light proceeds straight without bending within the liquid crystal layer 130.

While the first voltage and the second voltage have different values, if the difference between the values is small enough to make a maximum value of the electric field applied to the top surface 130_1 and the bottom surface 130_2 of the liquid crystal layer 130 not exceed a value of a threshold electric field for rotating the liquid crystal molecules 135, all of the liquid crystal molecules 135 may remain aligned horizontally. Therefore, the GRIN lens may not be formed, and light may proceed straight without bending within the liquid crystal layer 130.

As apparent from the above description, the liquid crystal lens 130 may be driven in the second mode not just when the first voltage and the second voltage are different but when the difference between the first voltage and the second voltage is within a predetermined range. That is, the maximum value of the electric field applied to the top and bottom surfaces 130_1 and 130_2 of the liquid crystal layer 130 by the difference between the first voltage and the second voltage should be higher than the value of the threshold electric field for rotating the liquid crystal molecules 135, and a minimum value of the electric field applied to the top and bottom surfaces 130_1 and 130_2 of the liquid crystal layer 130 by the difference between the first voltage and the second voltage should be lower than the value of the electric field for vertically rotating the liquid crystal molecules 135.

Even when the liquid crystal lens 1100 is driven in the second mode, the distribution of refractive index may vary according to the difference between the first voltage and the second voltage. That is, the difference between the first voltage and the second voltage controls the curvature of the GRIN lens shown in FIG. 7 in various ways. Accordingly, it is obvious that the focal length of the GRIN lens can be adjusted differently.

Those of ordinary skill in the art can easily implement detailed conditions for driving the liquid crystal lens 1100 in the first mode or the second mode and a method of controlling a focal length in the second mode by appropriately adjusting the first voltage and the second voltage according to the dielectric constant of a dielectric substance and the type of the liquid crystal molecules 135 with reference to the above-disclosed features. Thus, specific examples will be omitted in order to avoid ambiguous interpretation of the present invention.

While a case where the liquid crystal lens 1100 has two unit lens sections L1 and has been described above in the above exemplary embodiment, it is obvious that the liquid crystal lens 1100 can have two or more unit lens sections. The same is true in the following exemplary embodiments.

Hereinafter, liquid crystal lenses constructed as various exemplary embodiments according to the principles of the present invention will be described.

In some embodiments according to the principles of the present invention, liquid crystal lenses may have different light modulation characteristics in a first unit lens section and a second unit lens section. The liquid crystal lenses having such characteristics are shown in FIGS. 8 through 11.

Figure 8:
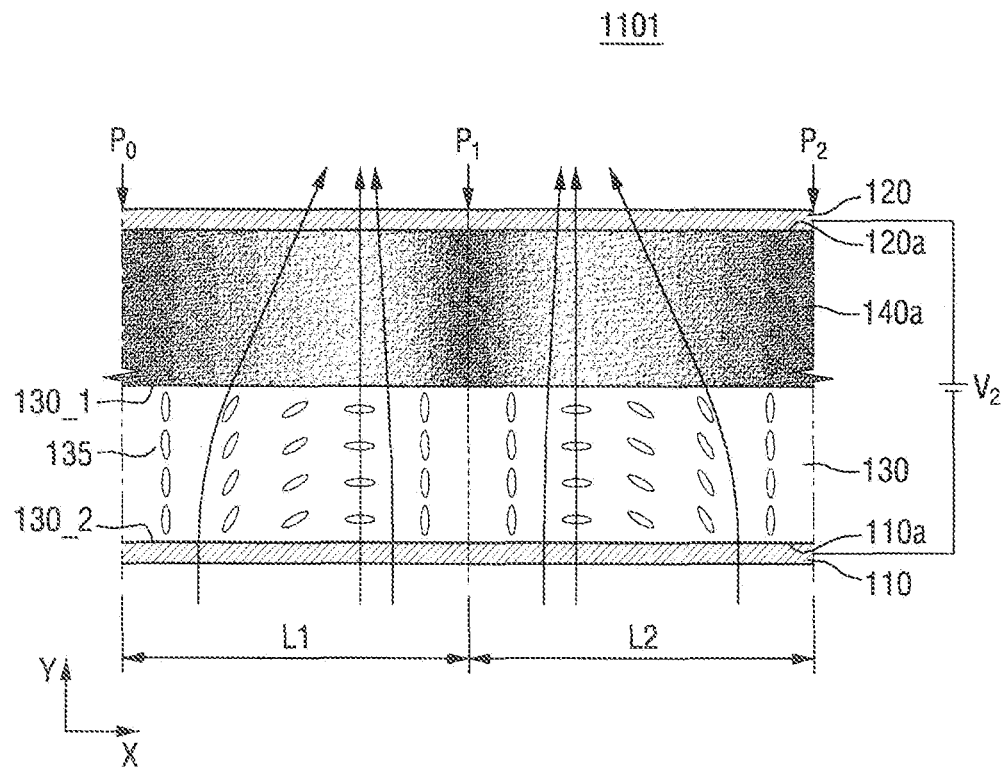
FIG. 8 is a cross-sectional view of a liquid crystal lens constructed as another exemplary embodiment according to the principles of the present invention.
Figure 9:
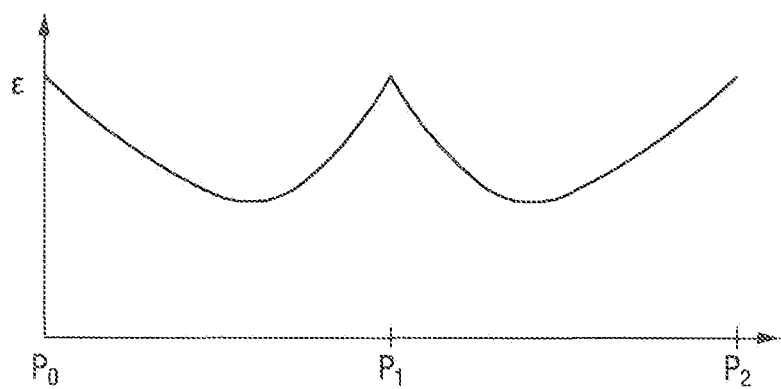
FIG. 9 is a graph illustrating the dielectric constant of a dielectric layer of FIG. 8 at each horizontal position.

FIG. 8 is a cross-sectional view of a liquid crystal lens 1101 constructed as another exemplary embodiment according to the principles of the present invention. FIG. 9 is a graph illustrating the dielectric constant of a dielectric layer 140a of FIG. 8 at each horizontal position. Referring to FIGS. 8 and 9, in the liquid crystal lens 1101 constructed as the current exemplary embodiment, a horizontal position at which the dielectric constant of the dielectric layer 140a has a minimum value in a first unit lens section L1 is different from a horizontal position at which the dielectric constant of the dielectric layer 140a has a minimum value in a second unit lens section L2. That is, in the first unit lens section L1, the minimum value of the dielectric constant of the dielectric layer 140a is located to the right of a midpoint between a position P0 and a position P1. On the other hand, in the second unit lens section L2, the maximum value of the dielectric constant of the dielectric layer 140a is located to the left of a midpoint between the position P1 and a position P2. Accordingly, as shown in FIG. 8, an optical path in the first unit lens section L1 slants toward the right compared with the optical path shown in FIG. 6, whereas an optical path in the second unit lens section L2 slants relatively toward the left.

Figure 10:
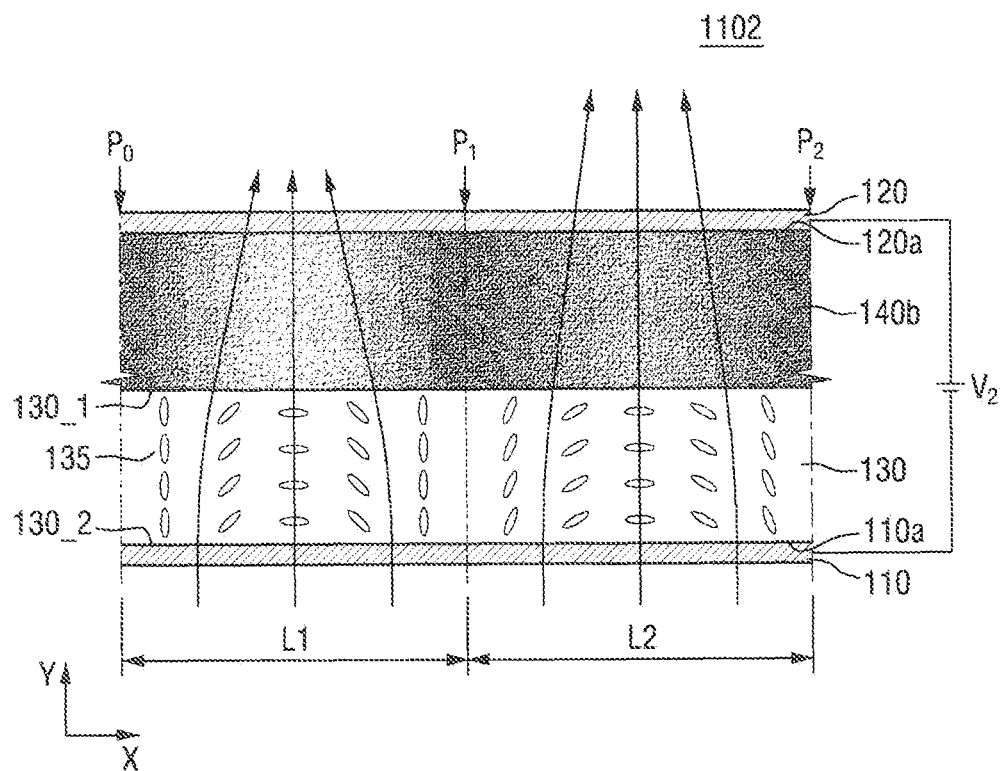
FIG. 10 is a cross-sectional view of a liquid crystal lens constructed as another exemplary embodiment according to the principles of the present invention.
Figure 11:
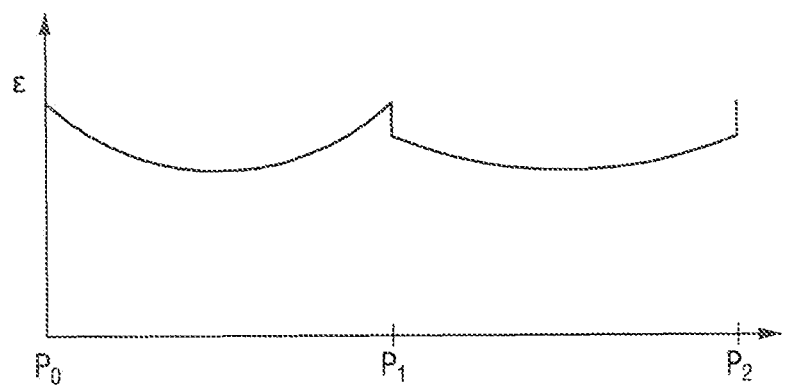
FIG. 11 is a graph illustrating the dielectric constant of a dielectric layer of FIG. 10 at each horizontal position.

FIG. 10 is a cross-sectional view of a liquid crystal lens 1102 constructed as another exemplary embodiment according to the principles of the present invention. FIG. 11 is a graph illustrating the dielectric constant of a dielectric layer 140b of FIG. 10 at each horizontal position. Referring to FIGS. 10 and 11, in the liquid crystal lens 1102 constructed as the current exemplary embodiment, a maximum value of the dielectric constant of the dielectric layer 140b in a first unit lens section L1 is different from a maximum value of the dielectric constant of the dielectric layer 140b in a second unit lens section L2. Accordingly, as shown in FIG. 11, a curvature of a dielectric constant curve of the dielectric layer 140b in the first unit lens section L1 is greater than that of a dielectric constant curve of the dielectric layer 140b in the second unit lens section L2.

Therefore, the variation in the dielectric constant of the dielectric layer 140b is greater in the first unit lens section L1, and the horizontal variation in an electric field applied to top and bottom surfaces 130_1 and 130_2 of a liquid crystal layer 130 is greater in the first unit lens section L1. As a result, as shown in FIG. 10, when the liquid crystal lens 1102 is driven in the second mode, an azimuth of liquid crystal molecules 135 differs more significantly from position to position in a horizontal direction in the first unit lens section L1. In addition, the variation in the refractive index of the liquid crystal molecules 135 is greater in the first unit lens section L1, thereby causing an optical path to be bent more than in the second unit lens section L2. Consequently, an optical focal length may be shorter in the first unit lens section L1 than in the second unit lens section L2.

Although not shown in the drawings, in liquid crystal lenses constructed as some other exemplary embodiments according to the principles of the present invention, while a dielectric layer has a different dielectric constant at each horizontal position in a first unit lens section as shown in FIG. 3A, it may have the same dielectric constant in a second unit lens section irrespective of positions in the horizontal direction. In this case, the first unit lens section of the liquid crystal lenses may have light modulation characteristics similar to those of a convex lens in the second mode. In the second unit lens section, however, only the first mode may be implemented in which light modulation does not occur.

Figure 12:
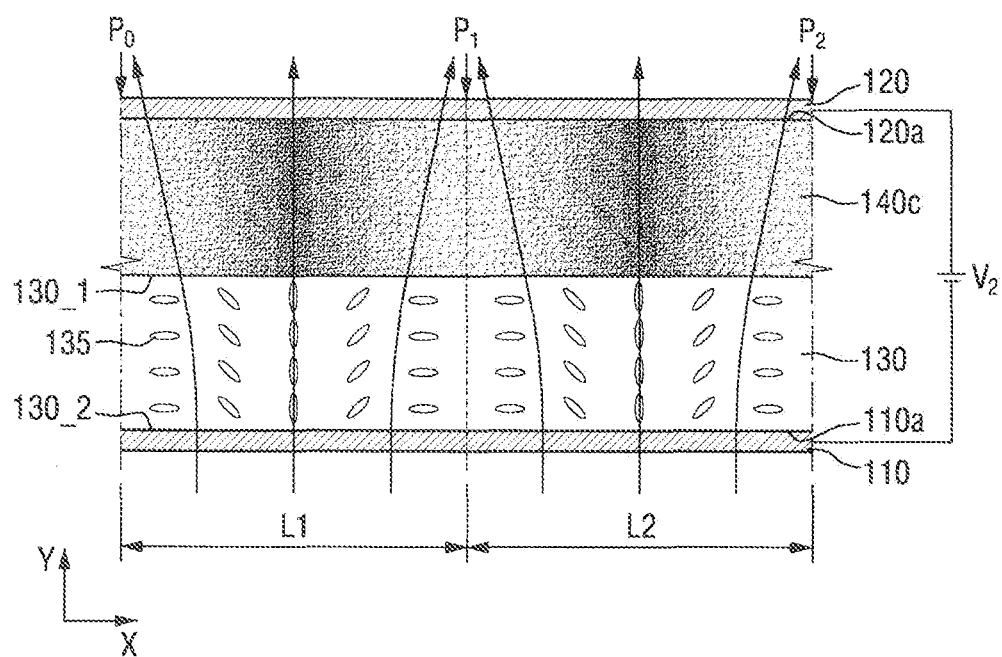
FIG. 12 is a cross-sectional view of a liquid crystal lens constructed as another exemplary embodiment according to the principles of the present invention.
Figure 13:
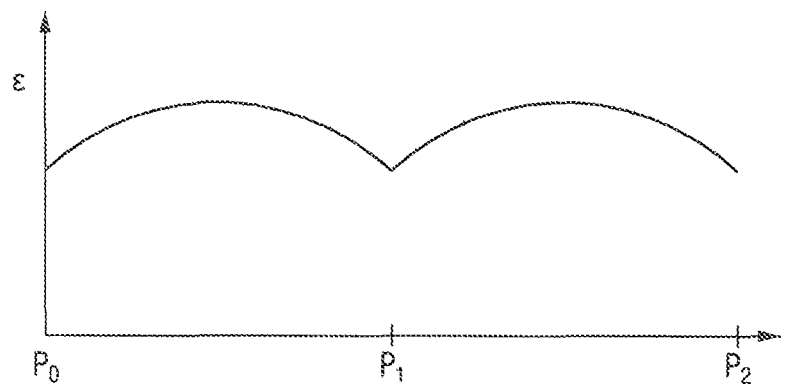
FIG. 13 is a graph illustrating the dielectric constant of a dielectric layer of FIG. 12 at each horizontal position.

FIG. 12 is a cross-sectional view of a liquid crystal lens 1103 constructed as another exemplary embodiment according to the principles of the present invention. FIG. 13 is a graph illustrating the dielectric constant of a dielectric layer 140c of FIG. 12 at each horizontal position. Referring to FIGS. 12 and 13, the dielectric constant of the dielectric layer 140c in a first unit lens section L1 of the liquid crystal lens 1103 constructed as the current exemplary embodiment increases and then decreases in a direction from a position P0 to a position P1. That is, the refractive index forms a parabolic curve that bulges downward. In a second unit lens section L2, the dielectric constant of the dielectric layer 140c forms the same parabolic curve as that of the first unit lens section L1. As described above, an optical path bends from a medium with a low refractive index to a medium with a high refractive index in the GRIN lens structure. Therefore, in a second mode, a liquid crystal layer 130 of FIG. 12 induces modulation of the optical path similarly to a concave lens. That is, in the second mode, the liquid crystal layer 130 of the liquid crystal lens 1103 can diverge or spread light without using a concave lens.

The above-described embodiments can be combined in various ways.

Specific embodiments in which a dielectric constant of a dielectric layer is controlled differently along the horizontal direction will be described. A description of components or elements substantially identical to those of the previous embodiments will be omitted or simplified.

Figure 14:
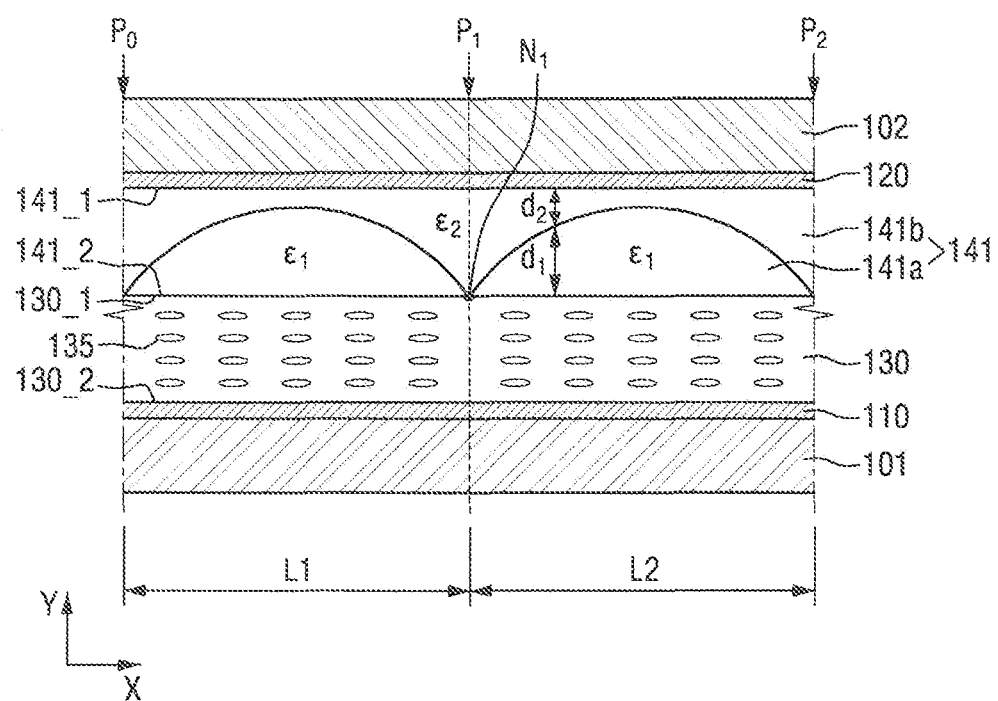
FIG. 14 is a cross-sectional view of a liquid crystal lens constructed as another exemplary embodiment according to the principles of the present invention.
Figure 15:
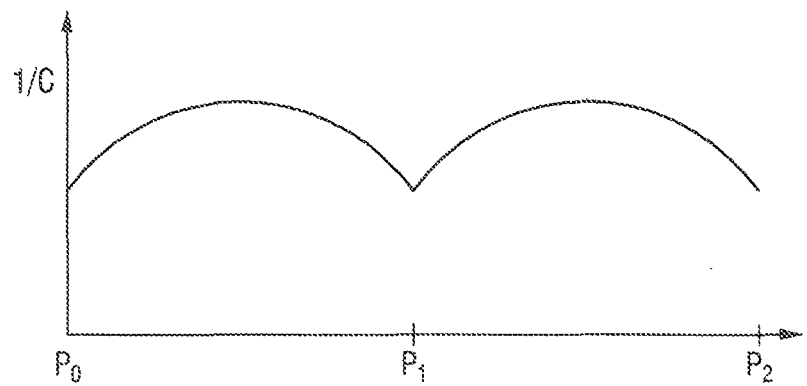
FIG. 15 is a graph illustrating the elastance of a dielectric layer of FIG. 14 at each horizontal position.

FIG. 14 is a cross-sectional view of a liquid crystal lens 1110 constructed as another exemplary embodiment according to the principles of the present invention. FIG. 15 is a graph illustrating the elastance of a dielectric layer 141 of FIG. 14 at each horizontal position. Referring to FIG. 14, the liquid crystal lens 1110 constructed as the current exemplary embodiment includes a first electrode 110 and a second electrode 120 which face each other and a liquid crystal layer 130 and the dielectric layer 141 which are interposed between the first electrode 110 and the second electrode 120. The dielectric layer 141 includes a first sub-dielectric layer 141a and a second sub-dielectric layer 141b.

The first electrode 110 may be formed on a first substrate 101. The second electrode 120 may be formed on a second substrate 102. The first substrate 101 and the second substrate 102 may be transparent substrates. For example, the first substrate 101 and the second substrate 102 may be transparent plastic substrates, transparent glass substrates, or transparent quartz substrates. In some embodiments, at least one of the first substrate 101 and the second substrate 102 may be a flexible substrate.

The liquid crystal layer 130 is formed on the first electrode 110. Top and bottom surfaces 130_1 and 130_2 of the liquid crystal layer 130 may be substantially flat. Further, the top and bottom surfaces 130_1 and 130_2 of the liquid crystal layer 130 may be parallel to each other. Although not shown in the drawing, a first alignment film, which initially aligns liquid crystal molecules 135 within the liquid crystal layer 130, may be interposed between the first electrode 110 and the bottom surface 130_1 of the liquid crystal layer 130.

The dielectric layer 141 is formed on the liquid crystal layer 130. A second alignment film (not shown) may be interposed between the top surface 130_1 of the liquid crystal layer 130 and a bottom surface 141_2 of the dielectric layer 141. The top and bottom surfaces 141_1 and 141_2 of the dielectric layer 141 may be flat and parallel to each other. The dielectric layer 141 includes the first sub-dielectric layer 141a and the second sub-dielectric layer 141b. The first sub-dielectric layer 141a and the second sub-dielectric layer 141b have different dielectric constants. For example, the dielectric constant of the first sub-dielectric layer 141a may be $\in_1$, and the dielectric constant of the second sub-dielectric layer 141b may be $\in_2$ which is lower than $\in_1$. Further, in some embodiments, the refractive index of the first sub-dielectric layer 141a may be the same as the refractive index of the second sub-dielectric layer 141b. Even when the dielectric constant of the first sub-dielectric layer 141a is different from the dielectric constant of the second sub-dielectric layer 141b, the light path may not bend at the interface regardless of its incident angle, if the refractive index of the first sub-dielectric layer 141a is the same as the refractive index of the second sub-dielectric layer 141b.

A distance between bottom and top surfaces of the first sub-dielectric layer 141a, in other words, a height d1 of a cross section of the first sub-dielectric layer 141a may differ from position to position in the horizontal direction. For example, while the bottom surface of the first sub-dielectric layer 141a is flat, if the top surface of the first sub-dielectric layer 141a is curved, the height h1 of the cross section of the first sub-dielectric layer 141a may be different at each position in the horizontal direction. The exemplary cross-sectional shape of the first sub-dielectric layer 141a is a dome or a convex lens. Although not shown in the drawing, the first sub-dielectric layer 141a can also be shaped like a concave lens.

The second sub-dielectric layer 141b is formed on the first sub-dielectric layer 141a. The second sub-dielectric layer 141b may completely cover the first sub-dielectric layer 141a. The first sub-dielectric layer 141a may divide the liquid crystal lens 1110 into two or more unit lens sections L1 and L2. When the first sub-dielectric layer 141a consists of a plurality of convex lens-shaped unit patterns connected to each other as shown in FIG. 14, a unit lens section may be assigned to each pattern. If the unit patterns of the first sub-dielectric layer 141a are substantially the same, it is obvious that electrical and optical characteristics of the unit lens sections L1 and L2 are substantially the same. In the cross-sectional view of FIG. 14, a plurality of convex lens-shaped patterns are connected to each other by a connecting point N1, and the connecting point N1 is located directly on the top surface 130_1 of the liquid crystal layer 130. However, even when the connecting point N1 is separated from the top surface 130_1 of the liquid crystal layer 130 and when lower ends of the convex patterns are connected to each other by a surface, the electrical and optical characteristics of the unit lens sections L1 and L2 are substantially the same.

The capacitance between the top and bottom surfaces 141_1 and 141_2 of the dielectric layer 141 is different at each horizontal position in one unit lens section L1 or L2. Assuming that a height of the first sub-dielectric layer 141a at each horizontal position is d1, that a height of the second sub-dielectric layer 141b is d2, and that the top and bottom surfaces 141_1 and 141_2 of the entire dielectric layer 141 are flat, the following equation may be established.

$$D=d1+d2 \quad (1)$$

where D is a distance between the top and bottom surfaces 141_1 and 141_2 of the entire dielectric layer 141 and is a constant.

Elastance 1/C between the top and bottom surfaces 141_1 and 141_2 of the dielectric layer 141 at each horizontal position may be given by Equation (2) below.

$$1/C = 1/C_1 + 1/C_2 = d_1/\in_1 S + d_2/\in_2 S \quad (2)$$

where C1 is capacitance of the first sub-dielectric layer 141a, C2 is capacitance of the second sub-dielectric layer 141b, and S is a cross-sectional area.

Equations (1) and (2) may be rearranged into Equation (3) below.

$$1/C = (d_1 \in_2 + d_2 \in_1)/\in_1 \in_2 S = \{(\in_2 - \in_1)d_1 + D \in_1\}/\in_1 \in_2 S \quad (3)$$

Since $\in_1$, $\in_2$, D and S can all be treated as constants in Equation (3), the capacitance C and the elastance 1/C of the dielectric layer 141 may vary according to the height d1 of the first sub-dielectric layer 141a. When $\in_2$ is greater than $\in_1$, ($\in_2 - \in_1$) is a positive number. Thus, the elastance 1/C of the dielectric layer 141 increases as the height d1 of the first sub-dielectric layer 141a increases.

Therefore, a graph of elastance 1/C of the dielectric layer 141 in the liquid crystal lens 1110 shown in FIG. 14 may show similar patterns to the patterns of the first sub-dielectric layer 141a as shown in FIG. 15. This graph of elastance 1/C of the dielectric layer 141 is similar to the graph (described above with reference to FIG. 3B) of dielectric constant of the dielectric layer 140 at each horizontal position in the liquid crystal lens 1100 of FIG. 2. In this regard, it can be easily understood that the liquid crystal lens 1110 of FIG. 14 exhibits substantially the same electrical and optical characteristics as the liquid crystal lens 1100 of FIG. 2.

While a case where $\in_2$ is higher than $\in_1$ has been described in the current exemplary embodiment, $\in_2$ can also be lower than $\in_1$. In this case, the following equation can be obtained from Equation (2).

$$1/C = (d_1 \in_2 + d_2 \in_1)/\in_1 \in_2 S = \{(\in_1 - \in_2)d_2 + D \in_2\}/\in_1 \in_2 S \quad (4)$$

Since $\in_1$, $\in_2$, D and S can all be treated as constants in Equation (4), capacitance C and the elastance 1/C of the dielectric layer 141 may vary according to a height d2 of the second sub-dielectric layer 141b. Since $\in_1$ is higher than $\in_2$, ($\in_1 - \in_2$) is a positive number. Therefore, the elastance 1/C of dielectric layer 141 increases as the height d2 of the second sub-dielectric layer 141b increases. In Equation (1), since the sum of d1 and d2 is constant, d1 decreases as d2 increases. Therefore, the elastance 1/C of the dielectric layer 141 increases as the height d1 of the first sub-dielectric layer 141a decreases.

In the current exemplary embodiment, when $\in_2$ is higher than $\in_1$, a graph of elastance of the dielectric layer 141 in the liquid crystal lens 1110 may have similar patterns to the horizontal symmetry of the graph of the elastance of the dielectric layer 140 of FIG. 2, as described with reference to FIG. 3B. In this case, it can be easily expected that the liquid crystal lens 1110 will exhibit substantially the same electrical and optical characteristics as the liquid crystal lens 1103 of FIG. 12.

In the current exemplary embodiment, a refractive index of the first sub-dielectric layer 141*a* may be equal to a refractive index of the second sub-dielectric layer 141*b*. In this case, the path of light may not bend at the interface between the first sub-dielectric layer 141*a* and the second sub-dielectric layer 141*b* regardless of its incident angle.

Figure 16:
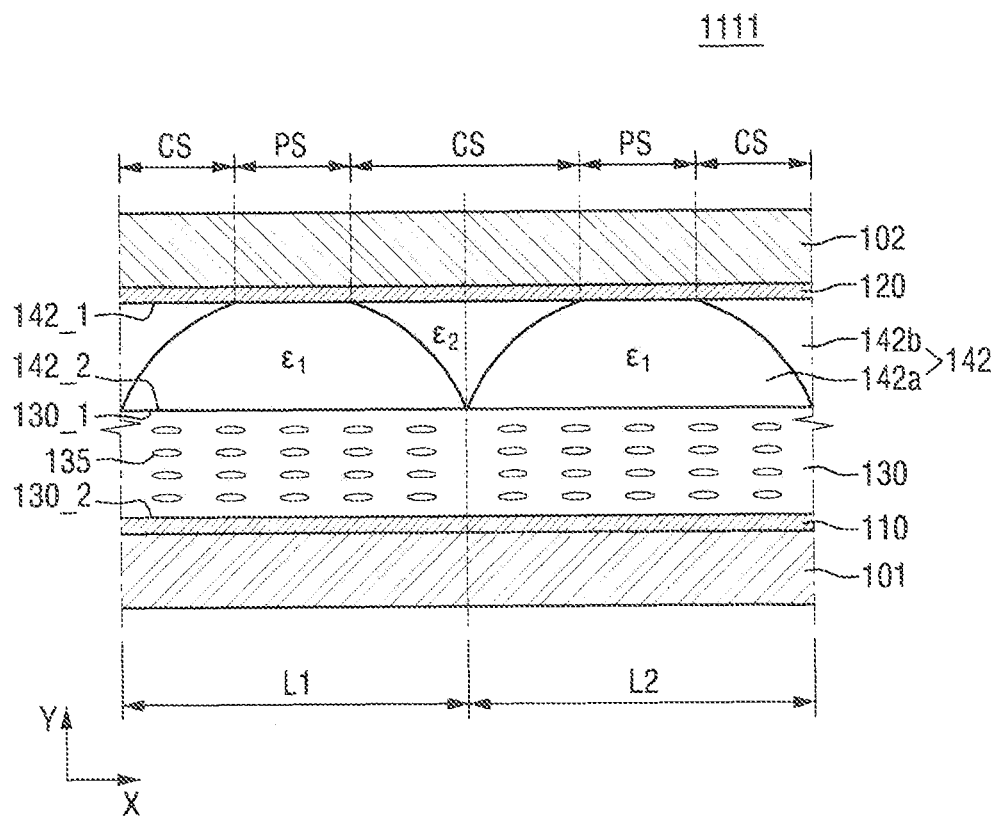
FIGS. 16 through 21 are cross-sectional views of liquid crystal lenses constructed as various exemplary embodiments according to the principles of the present invention.

FIG. 16 is a cross-sectional view of a liquid crystal lens 1111 constructed as another exemplary embodiment according to the principles of the present invention. Referring to FIG. 16, the liquid crystal lens 1111 constructed as the current exemplary embodiment is different from the liquid crystal lens 1110 constructed as the exemplary embodiment of FIG. 14 in that a top surface of a first sub-dielectric layer 142*a* is partially curved and partially flat and that a second sub-dielectric layer 142*b* partially covers a curved region of the top surface of the first sub-dielectric layer 142*a* but does not cover a flat region of the top surface of the first substrate-dielectric layer 141*a*. A top surface of the second sub-dielectric layer 142*b* is flat and is interrupted by the flat region of the top surface of the first sub-dielectric layer 142*a*. Therefore, a top surface 142_1 of a dielectric layer 142 consists of the flat top surface of the second sub-dielectric layer 142*b* and the flat region of the top surface of the first sub-dielectric layer 142*a*. A bottom surface 142_2 of the dielectric layer 142 consists of a bottom surface of the first sub-dielectric layer 142*a*.

In a first section CS in which the top surface of the first sub-dielectric layer 142*a* is curved, the distribution of elastance 1/C of the dielectric layer 142 is substantially the same as the distribution of elastance 1/C of the dielectric layer 141 constructed as the exemplary embodiment of FIG. 14. On the other hand, a second section PS in which the top surface of the first sub-dielectric layer 142*a* is flat does not include the second sub-dielectric layer 142*b* and includes only the first sub-dielectric layer 142*a*. In addition, a height of the first sub-dielectric layer 142*a* is constant in the second section PS. Therefore, the capacitance C of the entire dielectric layer 142 is constant in the second section PS. Accordingly, assuming that $\in$2 is lower than $\in$1, a graph of elastance 1/C of the dielectric layer 142 constructed as the current exemplary embodiment may show an upward convex curve in the first section CS but may show a straight line parallel to an axis of the second section PS in the second section PS, i.e., the X-axis.

In such distribution of elastance 1/C, an electric field applied to a liquid crystal layer 130 is different at each horizontal position at least in the first section CS. Therefore, when the liquid crystal lens 1111 is driven in a second mode, liquid crystal molecules 135 are arranged to have a different azimuth at each horizontal position in the first section CS. Accordingly, since a GRIN lens structure is formed at least in the first section CS, the first section CS may exhibit optical characteristics similar to those of a convex lens.

In the second section PS, an electric field applied to the liquid crystal layer 130 is the same at each horizontal position. Therefore, the electric field of the liquid crystal layer 130 may maintain the liquid crystal molecules 135 at the same azimuth across the entire second section PS. But, the azimuth of the liquid crystal molecules 135 may be affected not only by the electric field of the liquid crystal layer 130 but also by an azimuth of neighboring liquid crystal molecules 135 or a neighboring electric field.

For example, the liquid crystal molecules 135 may initially be aligned at an angle of zero degrees at first through third sequentially neighboring horizontal positions. The liquid crystal molecules 135 at the first horizontal position may be designed to have an azimuth of 20 degrees due to an electric field, and the liquid crystal molecules 135 at the second and third horizontal positions may be designed to have an azimuth of 10 degrees due to an electric field. In this case, although the liquid crystal molecules 135 at the second horizontal position are designed to be rotated 10 degrees by the electric field, they may be physically affected by the rotation of the liquid crystal molecules 135 at the neighboring first horizontal position. As a result, the liquid crystal molecules 135 at the second horizontal position may be rotated by an azimuth smaller than 20 degrees and greater than 10 degrees. That is, although an electric field is designed to sharply change the azimuth of the liquid crystal molecules 135 in a staircase manner along the horizontal direction, if the liquid crystal molecules 135 are affected by the rotation of neighboring liquid crystal molecules 135, the azimuth of the liquid crystal molecules 135 may change gently. This phenomenon may also occur due to the effect of a neighboring electric field.

In the exemplary embodiment of FIG. 16, the azimuth of the liquid crystal molecules 135 may change more gently at a boundary between the first section CS and the second section PS than the distribution of dielectric constant due to the effect of neighboring liquid crystal molecules 135 or the effect of a neighboring electric field. If the azimuth of the liquid crystal molecules 135 changes along the horizontal direction, the above-described GRIN structure is formed more easily, which, in turn, contributes to the bending of an optical path within the dielectric layer 142.

Figure 17:
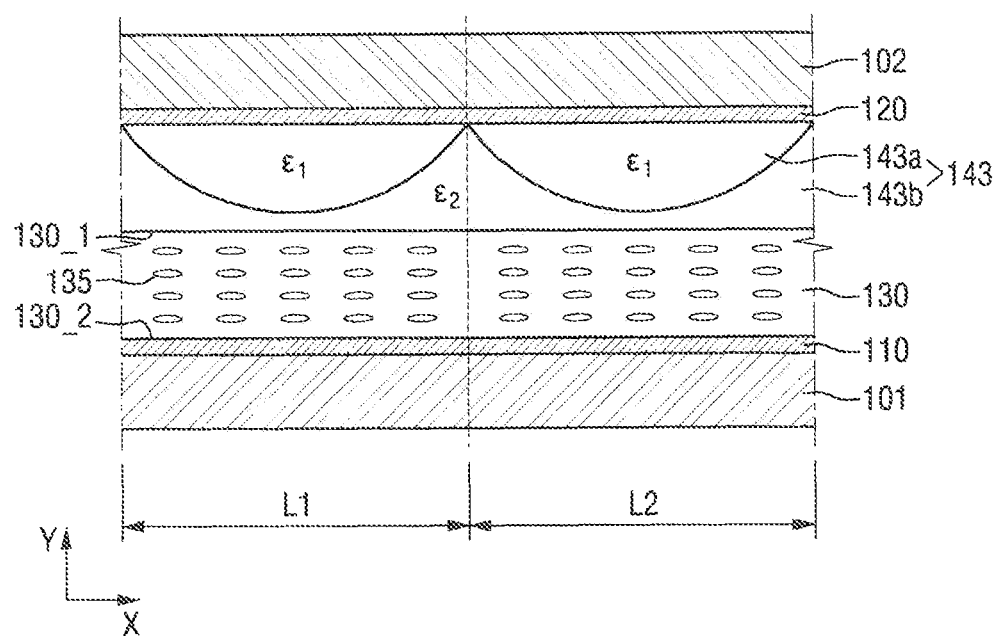

FIG. 17 is a cross-sectional view of a liquid crystal lens 1112 constructed as another exemplary embodiment according to the principles of the present invention. Referring to FIG. 17, the liquid crystal lens 1112 constructed as the current exemplary embodiment is different from the liquid crystal lens 1110 constructed as the exemplary embodiment of FIG. 14 in that the structure of the dielectric layer 141 is turned upside down in the case of a dielectric layer 143. That is, a top surface of a first sub-dielectric layer 143*a* is flat while a bottom surface thereof is curved. Thus, a cross section of the first sub-dielectric layer 143*a* is shaped like a convex lens. A second sub-dielectric layer 143*a* is disposed under the first sub-dielectric layer 143*a* to cover the first sub-dielectric layer 143*a*.

In the structure of the dielectric layer 143 of FIG. 17, a dielectric constant of the dielectric layer 143 also changes along a horizontal direction. Therefore, the liquid crystal lens 112 has a GRIN structure in which its refractive index changes along the horizontal direction. Here, the first sub-dielectric layer 143*a* may have a dielectric constant of $\in$1, and the second sub-dielectric layer 143*b* may have a dielectric constant of $\in$2 which is higher than $\in$1. In this case, the liquid crystal lens 1112 constructed as the current exemplary embodiment may certainly form a downward convex curve on a graph of distribution of elastance 1/C of the dielectric layer 143, which is opposite to the upward convex curve of FIG. 15.

Figure 18:
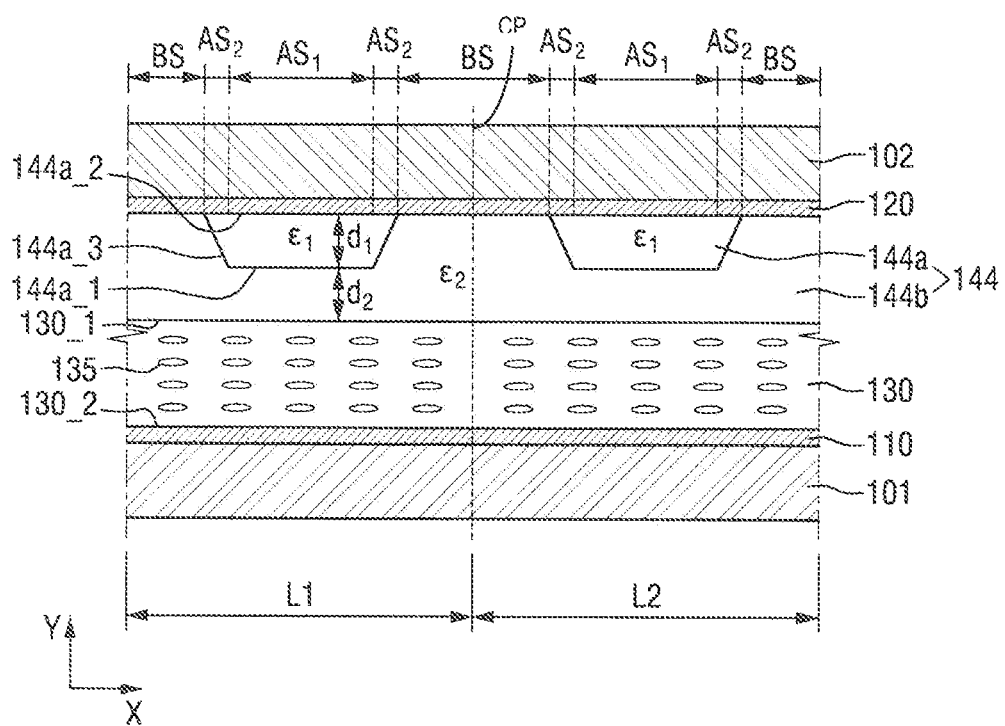

FIG. 18 is a cross-sectional view of a liquid crystal lens 1113 constructed as another exemplary embodiment according to the principles of the present invention. Referring to FIG. 18, a cross-section shape of a first sub-dielectric layer 144*a* in the liquid crystal lens 1113 constructed as the current exemplary embodiment is a trapezoid. The trapezoid may include a first side 144*a*_1 and a second side 144*a*_2 which are parallel to each other and face each other and a diagonal line 144a_3 which connects the first side 144a_1 and the second side 144a_2.

In a section AS2 which includes the diagonal line 144a_3, the capacitance C of the entire dielectric layer 144 which includes the first sub-dielectric layer 144a and the second sub-dielectric layer 144b is different at each horizontal position, similarly to the capacitance C of the entire dielectric layer 143 in FIG. 17. Although no curved surface exists in the section AS2, liquid crystal molecules 135 are arranged at a different azimuth at each horizontal position due to the difference in capacitance C in the section AS2. This induces a change in the refractive index of the liquid crystal lens 1113, thereby forming a GRIN lens structure. Thus, the section AS2 may function as an optical lens that bends an optical path.

In a section AS1 which includes the first side 144a1, since a height d1 of the first sub-dielectric layer 144a and a height d2 of the second sub-dielectric layer 144b are constant, the dielectric constant and capacitance C of the entire dielectric layer 144 may be constant. Therefore, an electric field of a liquid crystal layer 130 may maintain the liquid crystal molecules 135 at the same azimuth across the entire section AS1 which includes the first side 144a_1. However, as described above with reference to FIG. 16, the azimuth of the liquid crystal molecules 135 may be affected not only by the electric field of the liquid crystal layer 130 but also by an azimuth of neighboring liquid crystal molecules 135 or a neighboring electric field. Therefore, in the section AS1, the azimuth of the liquid crystal molecules 135 may also change gently, thereby forming a GRIN lens structure.

In the exemplary embodiment of FIG. 18, the first sub-dielectric layer 144a includes a plurality of unit patterns separated from each other. Each unit pattern of the first sub-dielectric layer 144a is surrounded by the second sub-dielectric layer 144b.

Since the unit patterns of the first sub-dielectric layer 144a are separated from each other, there exists, in the horizontal direction, a section BS which includes only the second sub-dielectric layer 144b without including the first sub-dielectric layer 144a. In the section BS which includes only the second sub-dielectric layer 144b, the dielectric constant is constant, and, accordingly, the capacitance C is also constant. Therefore, an electric field of the liquid crystal layer 130 in the section BS may maintain the liquid crystal molecules 135 at the same azimuth. However, as described above with reference to FIG. 16, the azimuth of the liquid crystal molecules 135 may be affected not only by the electric field of the liquid crystal layer 130 but also by an azimuth of neighboring liquid crystal molecules 135 or a neighboring electric field. Therefore, in the section BS, the azimuth of the liquid crystal molecules 135 may also change gently.

The unit patterns of the first sub-dielectric layer 144a are respectively located on right and left sides of the section BS which includes only the second sub-dielectric layer 144b. If the unit patterns of the first sub-dielectric layer 144a located on the right and left sides of the section BS have the same shape, the azimuth of the liquid crystal molecules 135 in the section BS which includes only the second sub-dielectric layer 144b may be substantially symmetrical with respect to a center CP of the section BS. Accordingly, the liquid crystal lens 1113 may be divided into different unit lens sections L1 and L2 by the center CP of the section BS which includes only the second sub-dielectric layer 144b.

Ultimately, in a second mode, the overall distribution of refractive index of the liquid crystal lens 1113 constructed as the current exemplary embodiment may be substantially similar to that of the liquid crystal lens 1112 of FIG. 17, although the variation in refractive index is different in each section. Therefore, the liquid crystal lens 1113 can function as a GRIN lens.

Figure 19:
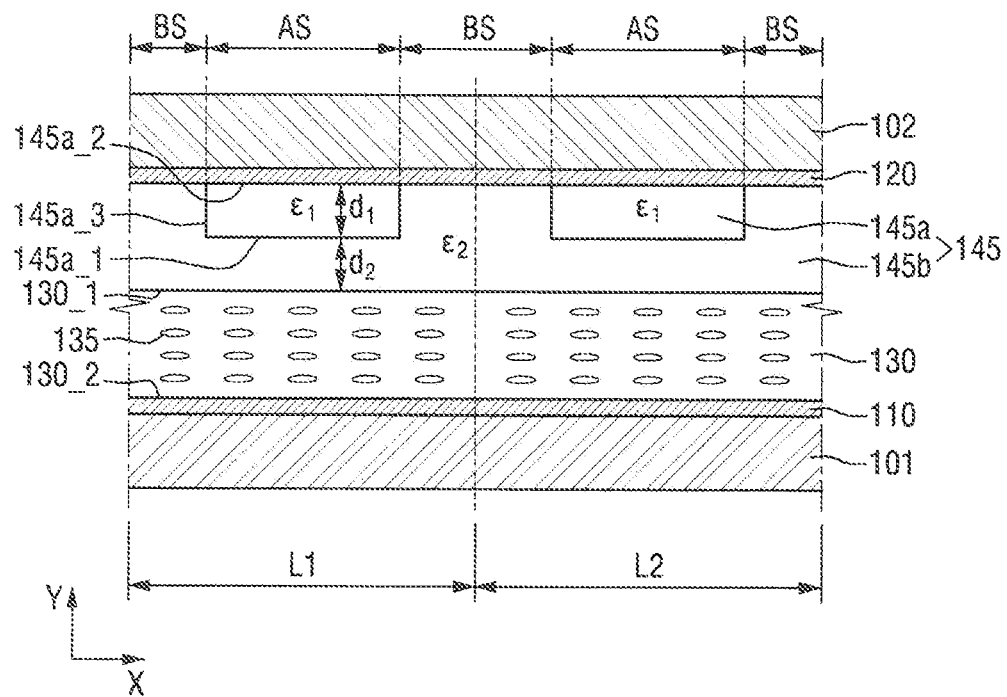

FIG. 19 is a cross-sectional view of a liquid crystal lens 1114 constructed as another exemplary embodiment according to the principles of the present invention. Referring to FIG. 19, the liquid crystal lens 1114 constructed as the current exemplary embodiment is different from the liquid crystal lens 1113 constructed as the exemplary embodiment of FIG. 18 in that a cross-sectional shape of a first sub-dielectric layer 145a is a rectangle. The rectangle is identical to the trapezoid of FIG. 18 in that it includes a first side 145a_1 and a second side 145a_2 which are parallel to each other and face each other. However, they are different in that the first side 145a_1 and the second side 145a_2 are connected by a line 145a_3 perpendicular to the first and second sides 145a_1 and 145a_2, not the diagonal line 144a_3.

Therefore, in a section AS which includes a first sub-dielectric layer 145a, since a height d1 of the first sub-dielectric layer 145a is equal to a height d2 of a second sub-dielectric layer 145b, the total dielectric constant and capacitance C of a dielectric layer 145 are constant. Although a section BS which does not include the first sub-dielectric layer 145a is different from the section AS, the total dielectric constant and capacitance C of the dielectric layer 145 are also constant across the entire section BS. That is, the total dielectric constant and capacitance C of the dielectric layer 145 sharply change at the line 145a_3 perpendicular to the first side 145a_1 and the second side 145a_2 of the first sub-dielectric layer 145a but do change at other positions. Even in this case, however, an azimuth of liquid crystal molecules 135 may be affected not only by an electric field of a liquid crystal layer 130 but also by an azimuth of neighboring liquid crystal molecules 135 or a neighboring electric field, as described above with reference to FIG. 16. Therefore, the azimuth of the liquid crystal molecules 135 may change gently at the line 145a_3 perpendicular to the first and second sides 145a_1 and 145a_2 of the first sub-dielectric layer 145a, thereby forming a GRIN lens structure.

Figure 20:
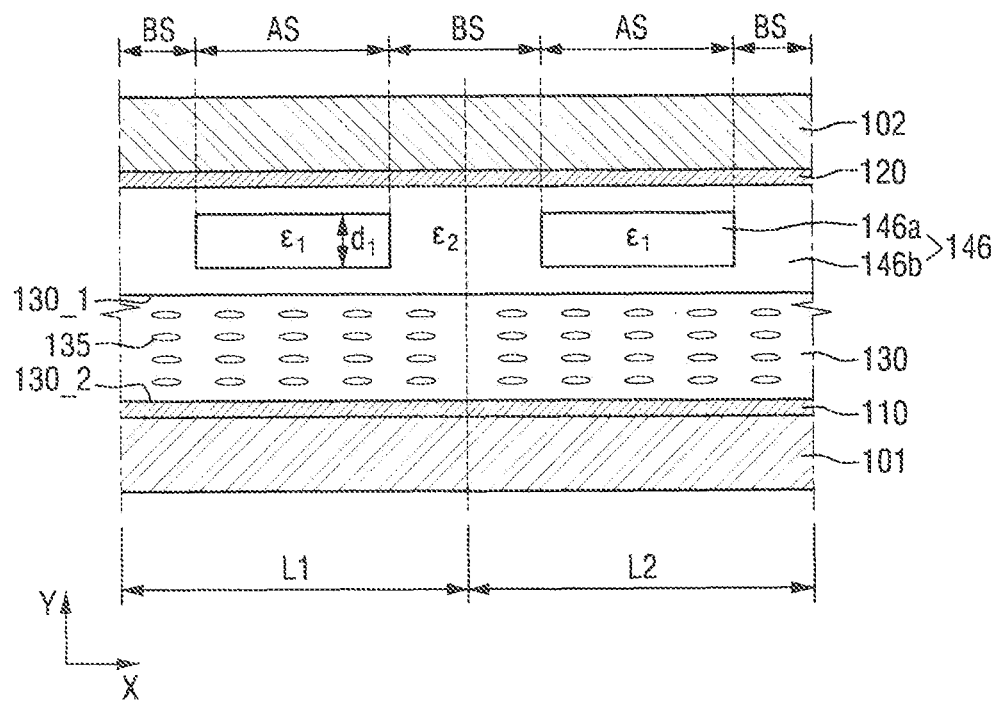

FIG. 20 is a cross-sectional view of a liquid crystal lens 1115 constructed as another exemplary embodiment according to the principles of the present invention. Referring to FIG. 20, the liquid crystal lens 1115 constructed as the current exemplary embodiment and the liquid crystal lens 1114 constructed as the exemplary embodiment of FIG. 19 are identical in the shape of a first sub-dielectric layer 146a but are different in that the first sub-dielectric layer 146a is buried in a second sub-dielectric layer 146b.

Despite the difference in the position of the first sub-dielectric layer 146a, a height d1 of the first sub-dielectric layer 146a is equal to the height d1 of the first sub-dielectric layer 145a of FIG. 19 in a section AS which includes the first sub-dielectric layer 146a. In addition, the sum of heights of the second sub-dielectric layer 146b is equal to the height d2 of the second sub-dielectric layer 145b of FIG. 19 in the section AS. Thus, the total dielectric constant and capacitance C of a dielectric layer 146 are substantially the same as those of the dielectric layer 145 in FIG. 19. Accordingly, it can be easily understood that the dielectric layer 146 operates in the same way as the dielectric layer 145 of FIG. 19.

Figure 21:
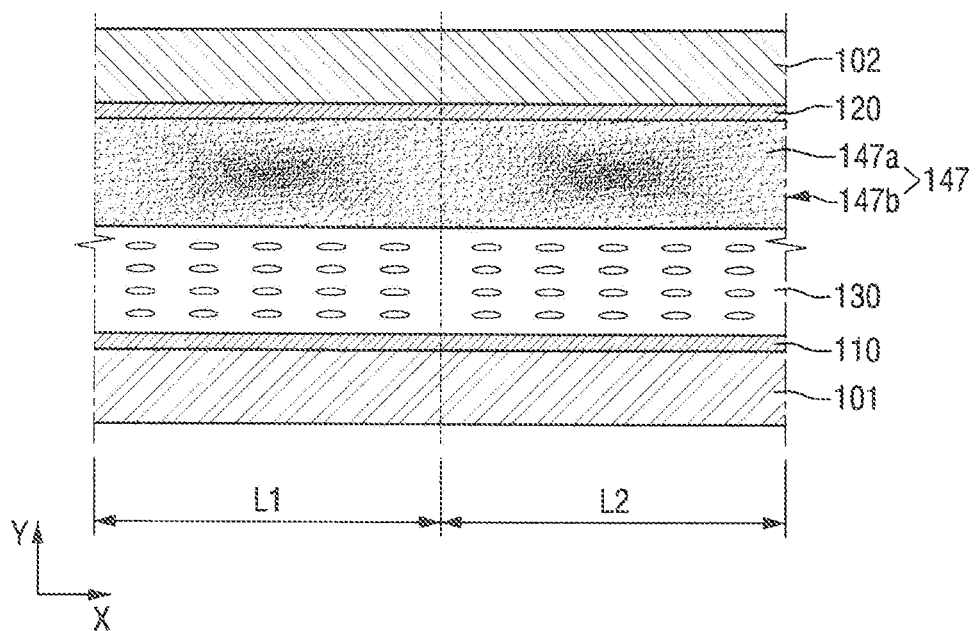

FIG. 21 is a cross-sectional view of a liquid crystal lens 1116 constructed as another exemplary embodiment according to the principles of the present invention. Referring to FIG. 21, a dielectric layer 147 of the liquid crystal lens 1116 constructed as the current exemplary embodiment includes a dielectric layer medium 147b and dopants 147a contained in the dielectric layer medium 147b. The dopants 147a are distributed with a different density at each horizontal position within the dielectric layer medium 147b.

A dielectric constant of the dielectric layer 147 is affected not only by a dielectric constant of the dielectric layer medium 147b but also by the content and dielectric constant of the dopants 147a contained in the dielectric layer medium 147b. For example, when a conductive material is used as the dopants 147a, a greater content of the dopants 147a may cause the dielectric constant of the dielectric layer 147 to be lower than the dielectric constant of the dielectric layer medium 147b. When the dielectric constant of the dopants 147a is higher than that of the dielectric layer medium 147b, the dielectric constant of the dielectric layer 147 may be higher than that of the dielectric layer medium 147b.

The change in the dielectric constant of the dielectric layer 147 by the dopants 147a increases as the content of the dopants 147a increases. Therefore, when the content of the dopants 147a is different at each horizontal position, the dielectric layer 147 may have a different dielectric constant at each horizontal position. Thus, by controlling the dielectric constant, content and distribution of the dopants 147a, the dielectric layer 147 having substantially the same distribution of dielectric constant in the horizontal direction as those constructed as the above-described embodiments can be formed.

Figure 22:
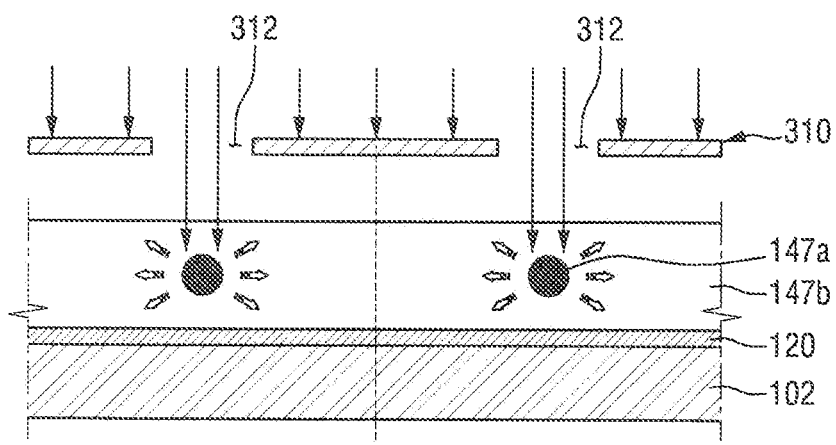
FIG. 22 is a cross-sectional view for explaining an exemplary method of manufacturing a dielectric layer shown in FIG. 21 as an exemplary embodiment according to the principles of the present invention.

FIG. 22 is a cross-sectional view for explaining an exemplary method of manufacturing the dielectric layer 147 shown in FIG. 21 as an embodiment according to the principles of the present invention. Referring to FIG. 22, a second electrode 120 is formed on a second substrate 102, and the dielectric layer medium 147b is formed on the second electrode 120. Then, the dopants 147a are ion-implanted into the dielectric layer medium 147b by using a mask 310. The dopants 147a ion-implanted into the dielectric layer medium 147b through openings 312 of the mask 310 are dispersed by, e.g., a heat-treatment process. Here, the degree to which the dopants 147a are dispersed can be controlled by adjusting the duration of the heat-treatment process. Accordingly, the density distribution of the dopants 147a in the dielectric layer 147 along the horizontal direction can be controlled.

Figure 23:
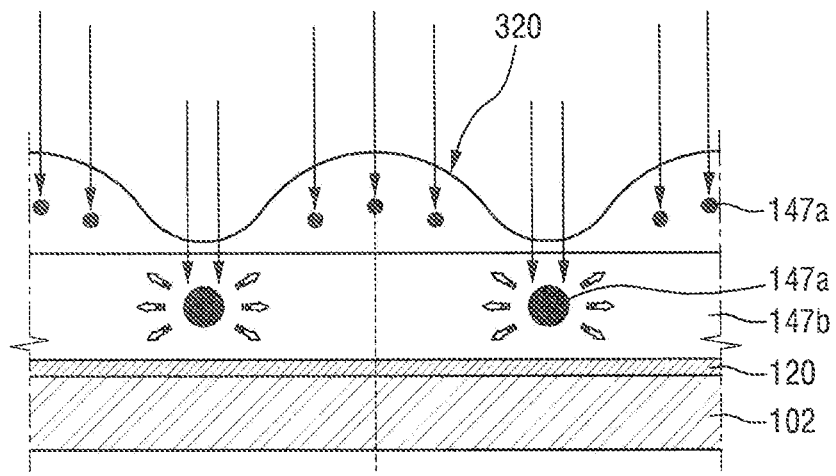
FIG. 23 is a cross-sectional view for explaining another exemplary method of manufacturing the dielectric layer shown in FIG. 21 as another exemplary embodiment according to the principles of the present invention.

FIG. 23 is a cross-sectional view for explaining another exemplary method of manufacturing the dielectric layer 147 shown in FIG. 21 as another embodiment according to the principles of the present invention. Referring to FIG. 23, the second electrode 120 is formed on the second substrate 102, and the dielectric layer medium 147b is formed on the second electrode 120. Then, a mask pattern 320 is formed on the dielectric layer medium 147b. The mask pattern 320 includes open portions, or at least a thickness of the mask pattern 320 changes along a horizontal direction. The mask pattern 320 may be made of, e.g., photoresist.

Next, the dopants 147a are ion-implanted. Here, a depth to which the dopants 147a are implanted may be controlled by adjusting the content of the dopants 147a and/or the implantation energy. When a depth to which the dopants 147a are implanted is designed to be smaller than a maximum height of the mask pattern 320, the dopants 147a may be distributed with a different density at each horizontal position.

Figure 24:
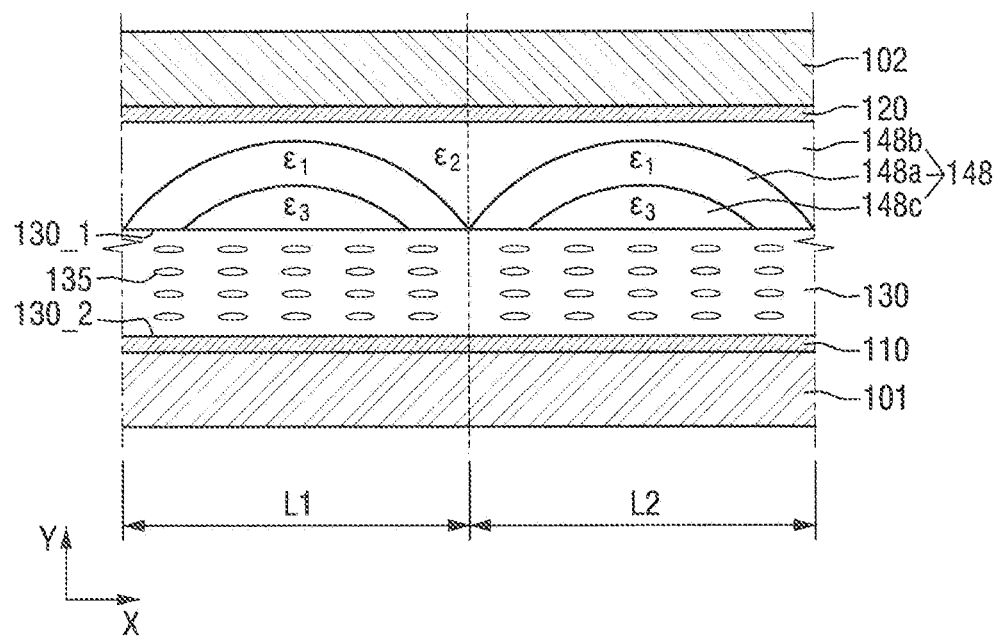
FIGS. 24 through 34 are cross-sectional views of liquid crystal lenses constructed as various exemplary embodiments according to the principles of the present invention.

FIG. 24 is a cross-sectional view of a liquid crystal lens 1117 constructed as another exemplary embodiment according to the principles of the present invention. Referring to FIG. 24, the liquid crystal lens 1117 constructed as the current exemplary embodiment is different from the liquid crystal lens 1110 constructed as the exemplary embodiment of FIG. 14 in that a first sub-dielectric layer 148a covers a third sub-dielectric layer 148c. Therefore, a dielectric layer 148 includes not only a section which includes the first sub-dielectric layer 148a and a second sub-dielectric layer 148b but also a section which includes all of the first through third sub-dielectric layers 148a through 148c. In the latter section, a dielectric constant of the dielectric layer 148 is determined by the dielectric constants and heights of the three sub-dielectric layers 148a through 148c.

Like this, an increase in the number of sub-dielectric layers 148a through 148c enables various combinations of dielectric constants, thus contributing to the fine tuning of the distribution of dielectric constant of the dielectric layer 148.

Figure 25:
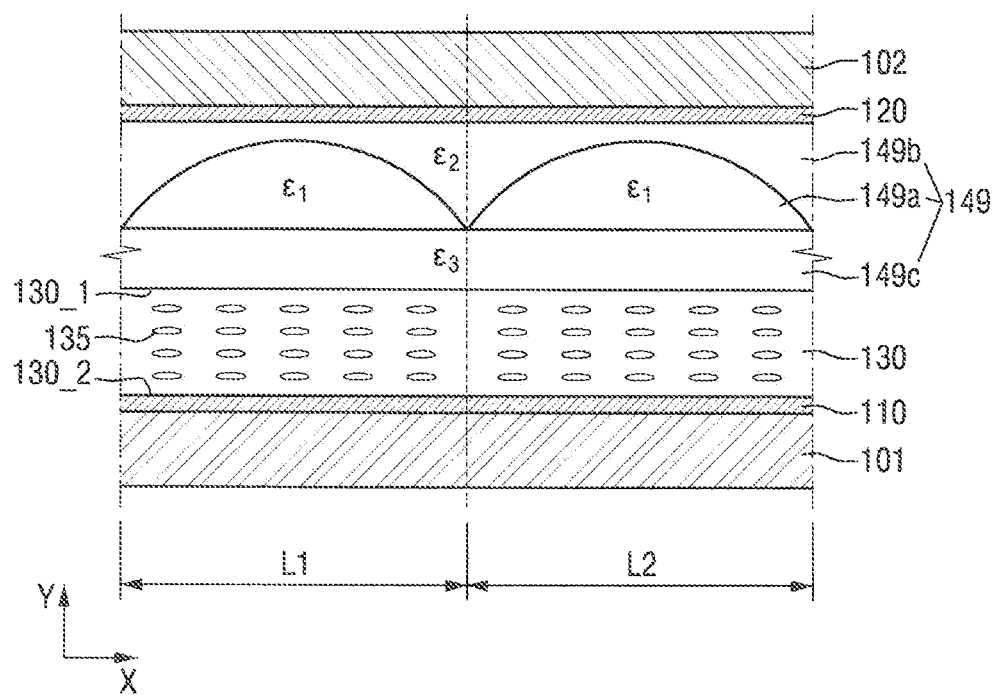

FIG. 25 is a cross-sectional view of a liquid crystal lens 1118 constructed as another exemplary embodiment according to the principles of the present invention. Referring to FIG. 25, the liquid crystal lens 1118 constructed as the current exemplary embodiment and the liquid crystal lens 1110 constructed as the exemplary embodiment of FIG. 14 are substantially identical in the shapes and relative positions of a first sub-dielectric layer 149a and a second sub-dielectric layer 149b but are different in that a third sub-dielectric layer 149c having top and bottom surfaces which are flat and parallel to each other is provided under the first sub-dielectric layer 149a and the second sub-dielectric layer 149b.

The total dielectric constant and capacitance C of a dielectric layer 149 at each horizontal position are affected not only by the dielectric constants and heights of the first sub-dielectric layer 149a and the second sub-dielectric layer 149b but also by the dielectric constant and height of the third sub-dielectric layer 149c. Since the height of the third sub-dielectric layer 149e is constant along the horizontal direction, the substantial distribution of dielectric constant of the dielectric layer 149 at each horizontal position may be similar to that of the dielectric layer 141 shown in FIG. 15. In the current exemplary embodiment, the third sub-dielectric layer 149c is formed under the first sub-dielectric layer 149a and the second sub-dielectric layer 149b. However, the third sub-dielectric layer 149c can also be stacked on the first sub-dielectric layer 149a and the second sub-dielectric layer 149b or can be stacked on and under the first sub-dielectric layer 149a and the second sub-dielectric layer 149b.

Figure 26:
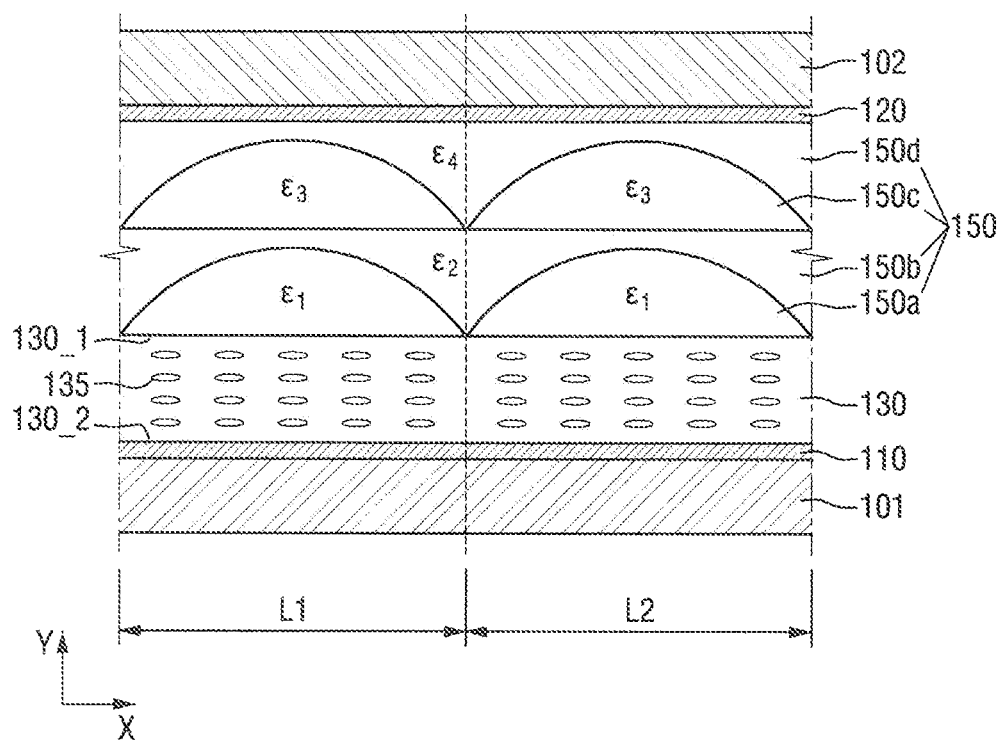

FIG. 26 is a cross-sectional view of a liquid crystal lens 1119 constructed as another exemplary embodiment according to the principles of the present invention. Referring to FIG. 26, the liquid crystal lens 1119 constructed as the current exemplary embodiment is different from the liquid crystal lens 1110 constructed as the exemplary embodiment of FIG. 4 in that a dielectric layer 150 includes a third sub-dielectric layer 150c and a fourth sub-dielectric layer 150d in addition to a first sub-dielectric layer 150a and a second sub-dielectric layer 150b. However, the shapes and positions of the first sub-dielectric layer 150a and the second sub-dielectric layer 150b are substantially the same as those of the first sub-dielectric layer 141a and the second sub-dielectric layer 141b shown in FIG. 14. The shapes and positions of the third sub-dielectric layer 150c and the fourth sub-dielectric layer 150d are substantially the same as those of the first sub-dielectric layer 150a and the second sub-dielectric layer 1506. That is, in the exemplary embodiment of FIG. 26, the dielectric layer 141 of FIG. 14 is stacked in two layers. Accordingly, this enables the formation of a GRIN lens which has substantially the same distribution of refractive index as the liquid crystal lens 1110 of FIG. 14 but has a greater gradient of change in refractive index than the liquid crystal lens 1110 of FIG. 14. Dielectric constants of the third sub-dielectric layer 150c and the fourth sub-dielectric layer 150d may be equal to or different from those of the first sub-dielectric layer 150a and the second sub-dielectric layer 150b, respectively.

Figure 27:
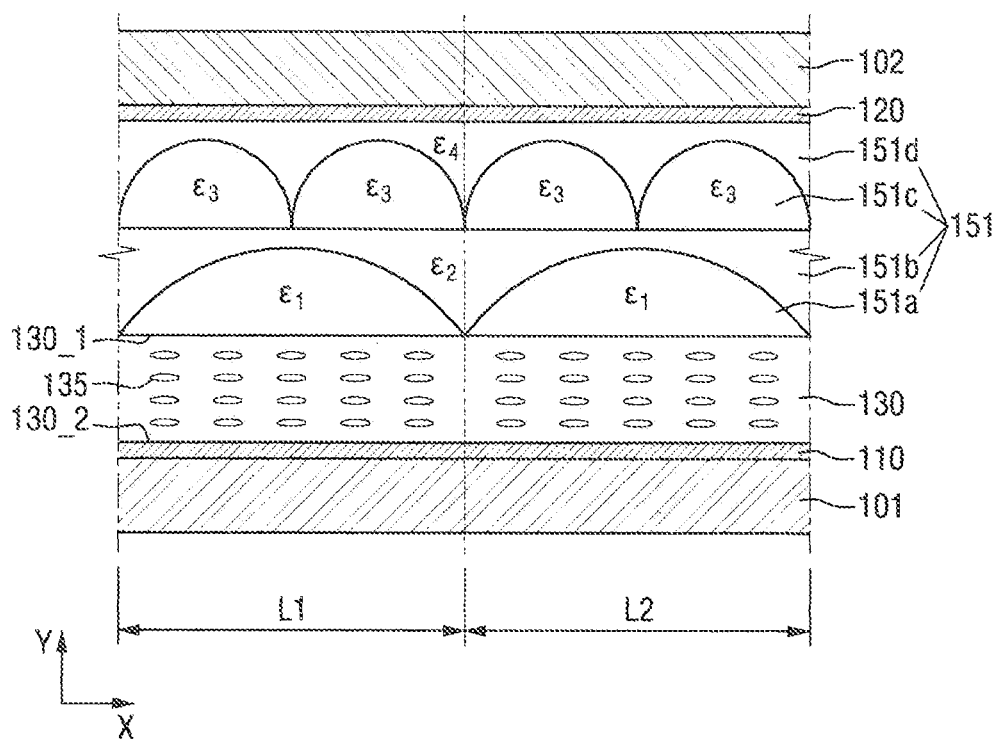
Figure 28:
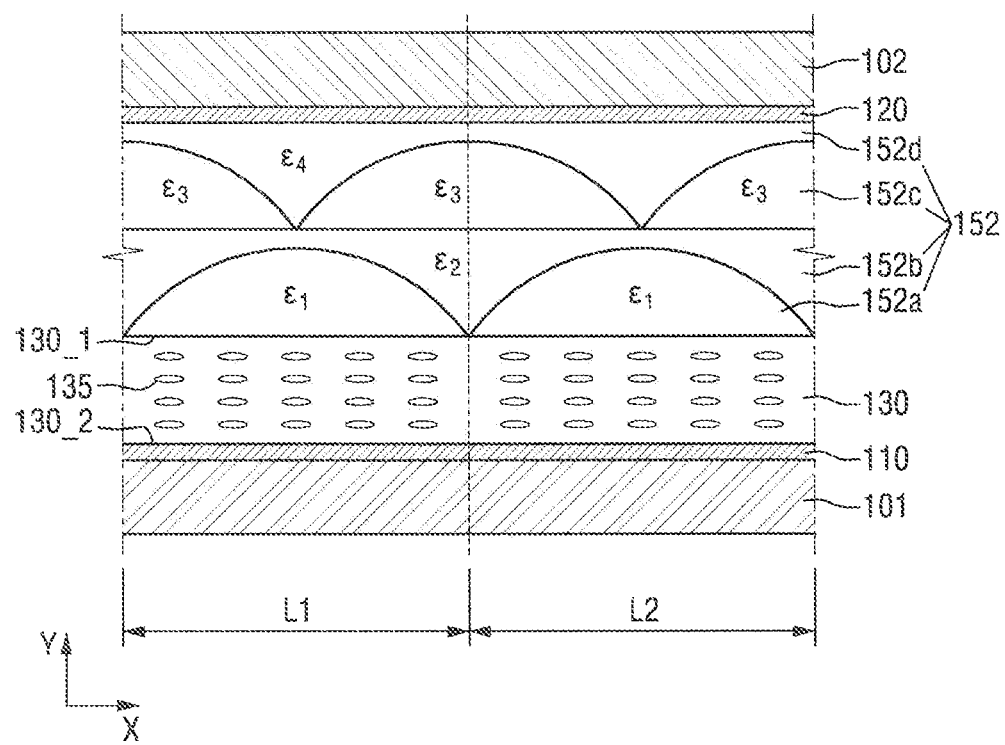

FIGS. 27 and 28 are cross-sectional views of liquid crystal lenses 1120 and 1121 constructed as other exemplary embodiments according to the principles of the present invention. In the liquid crystal lens 1120 of FIG. 27, the size and pitch of each unit pattern of a third sub-dielectric layer 151c are smaller than those of each unit pattern of a first sub-dielectric layer 151a. Specifically, the size and pitch of each unit pattern of the third sub-dielectric layer 151c are half the size and pitch of each unit pattern of the first sub-dielectric layer 151a. This structure is advantageous in controlling the total dielectric constant of a dielectric layer 151 more minutely. Undescribed reference numerals 151b and 151d indicate a second sub-dielectric layer and a fourth sub-dielectric layer, respectively.

In the liquid crystal lens 1121 of FIG. 28, unit patterns of a third sub-dielectric layer 152c are the same size as those of a first sub-dielectric layer 152a. However, the unit patterns of the third sub-dielectric layer 152c and the unit patterns of the first sub-dielectric layer 152a are arranged alternately. This structure allows more diverse distributions of dielectric constant. Undescribed reference numerals 152b and 152d indicate a second sub-dielectric layer and a fourth sub-dielectric layer, respectively.

Figure 29:
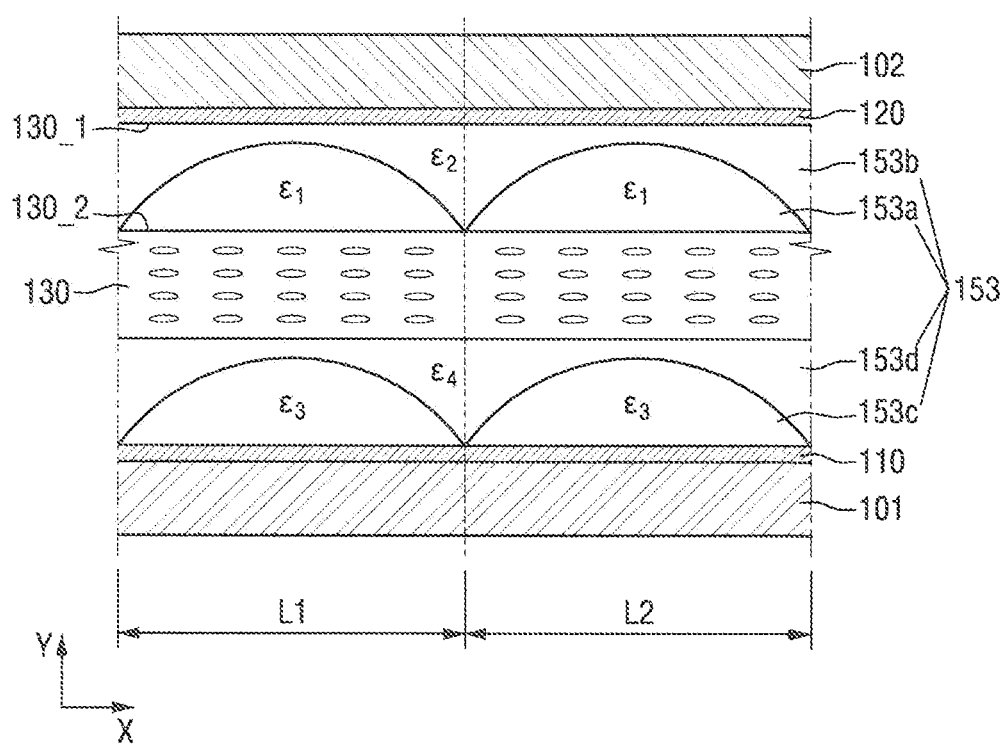

FIG. 29 is a cross-sectional view of a liquid crystal lens 1122 constructed as another exemplary embodiment according to the principles of the present invention. Referring to FIG. 29, the liquid crystal lens 1122 constructed as the current exemplary embodiment is different from the liquid crystal lens 1119 constructed as the exemplary embodiment of FIG. 26 in that a third sub-dielectric layer 153c and a fourth sub-dielectric layer 153d are formed under a liquid crystal layer 130. A first electrode 110 is disposed under the third sub-dielectric layer 153c and the fourth sub-dielectric layer 153d. A first sub-dielectric layer 153a and a second sub-dielectric layer 153b are substantially the same as those of FIG. 26. Therefore, since electrical and optical structures constructed as the current exemplary embodiment are substantially the same as those of FIG. 26, a GRIN lens substantially similar to that of FIG. 26 can be realized.

In the embodiments of FIGS. 26 through 29, unit patterns of a first sub-dielectric layer and a third sub-dielectric layer have a curved surface that bulges upward. However, at least one or all of the unit patterns of the first sub-dielectric layer and the third sub-dielectric layer can have a curved surface that bulges downward as in the exemplary embodiment of FIG. 17.

Figure 30:
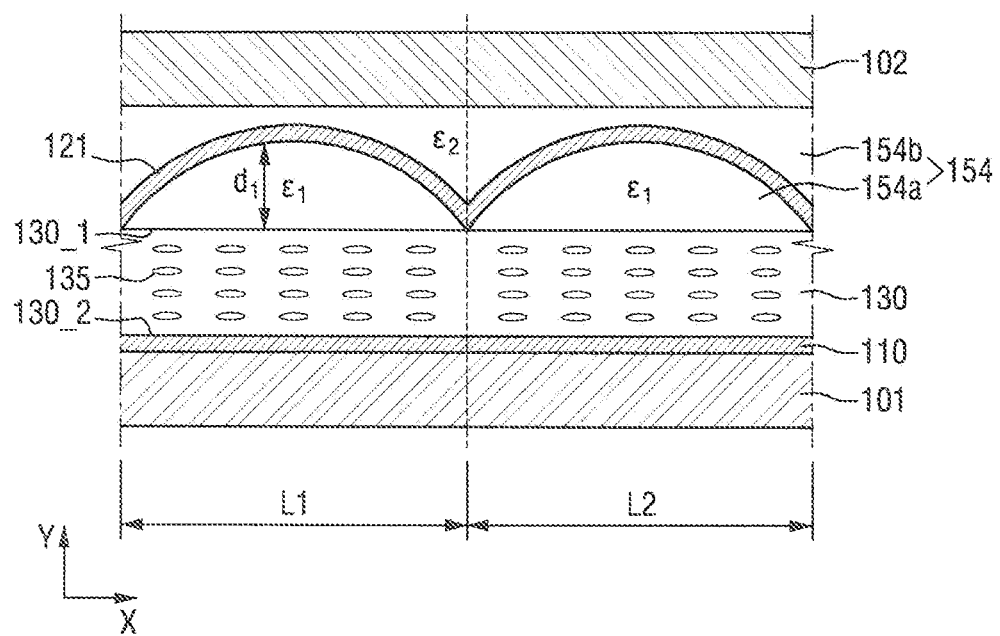

FIG. 30 is a cross-sectional view of a liquid crystal lens 1123 constructed as another exemplary embodiment according to the principles of the present invention. Referring to FIG. 30, the liquid crystal lens 1123 constructed as the current exemplary embodiment is different from the liquid crystal lens 1110 constructed as the exemplary embodiment of FIG. 14 in that a second electrode 121 is not disposed on a dielectric layer 154 and a liquid crystal layer 130 but is disposed within the dielectric layer 154, specifically, between a first sub-dielectric layer 154a and a second sub-dielectric layer 154b. Since a top surface of the first sub-dielectric layer 154a is curved, the second electrode 121 formed conformally on the top surface of the first sub-dielectric layer 154a may have a curved surface. In the present specification and the claims, the term "conformally" means that all angles between the intersecting curves of the second electrode 121 and the top surface of the first sub-dielectric layer 154 remain unchanged. Only the first sub-dielectric layer 154a is formed between the second electrode 121 and a top surface 130_1 of the liquid crystal layer 130, and the second sub-dielectric layer 154b is not formed between them.

Although a dielectric constant of the first sub-dielectric layer 154a is constant along a horizontal direction, a height d1 of the first sub-dielectric layer 154a changes along the horizontal direction. Therefore, the distribution of elastance 1/C is different at each horizontal position. That is, a section in which the height d1 of the first sub-dielectric layer 154a is lowest has lowest elastance 1/C. However, as the height d1 of the first sub-dielectric layer 154a increases, the elastance 1/C also increases. Accordingly, it can be understood that a voltage applied to the top surface 130_1 of the liquid crystal layer 130 changes along the horizontal direction. As a result, when the liquid crystal lens 1123 is driven in a second mode, liquid crystal molecules 135 have a different azimuth at each horizontal position, thereby realizing a GRIN lens structure.

In the current exemplary embodiment, a dielectric constant of the second sub-dielectric layer 154b does not affect an electric field applied to the liquid crystal layer 130. Therefore, the second sub-dielectric layer 154b can be omitted.

Figure 31:
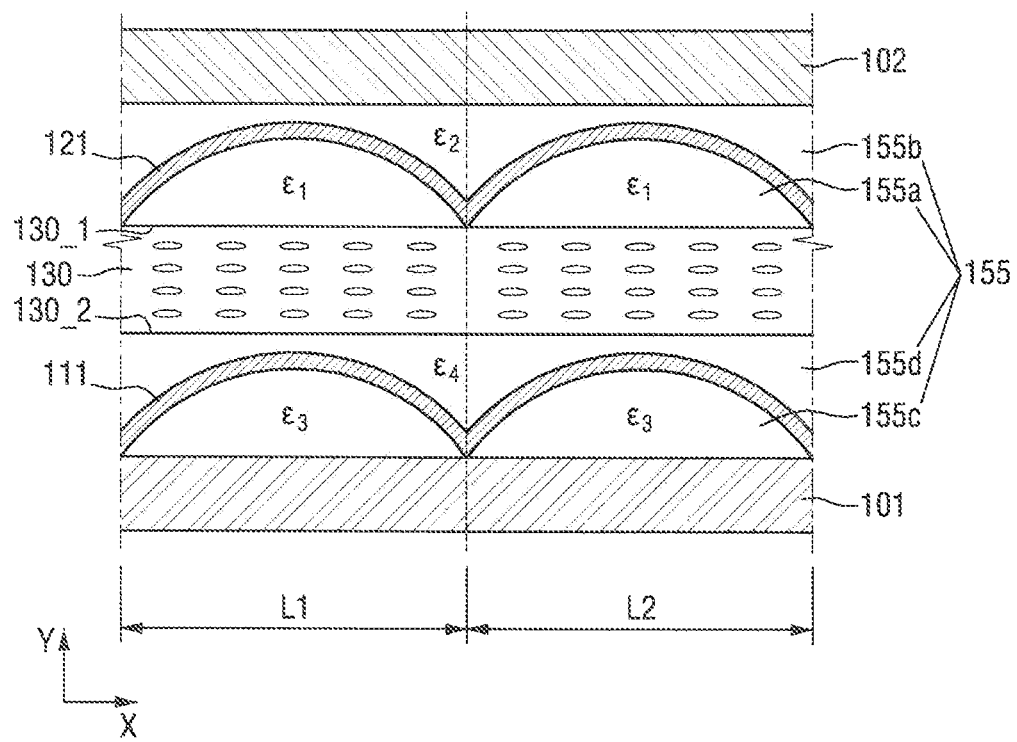

FIG. 31 is a cross-sectional view of a liquid crystal lens 1124 constructed as another exemplary embodiment according to the principles of the present invention. Referring to FIG. 31, the liquid crystal lens 1124 constructed as the current exemplary embodiment is different from the liquid crystal lens 1123 constructed as the exemplary embodiment of FIG. 30 in that a third sub-dielectric layer 155c having a curved top surface and a fourth sub-dielectric layer 155d covering the third sub-dielectric layer 155c are disposed under a liquid crystal layer 130 and that a first electrode 111 is formed between the third sub-dielectric layer 155c and the fourth sub-dielectric layer 155d. The shapes and arrangement of the third sub-dielectric layer 155c, the fourth sub-dielectric layer 155d, and the first electrode 111 under the liquid crystal layer 130 may be substantially the same as those of a first sub-dielectric layer 155a, a second sub-dielectric layer 155b, and a second electrode 121.

In the current exemplary embodiment, not only a voltage applied to a top surface of the liquid crystal layer 130 but also a voltage applied to a bottom surface 130_2 of the liquid crystal layer 130 may change along a horizontal direction. Therefore, the difference between electric fields formed in the top and bottom surfaces of the liquid crystal layer 130 may double, thereby easily realizing a GRIN lens structure.

Figure 32:
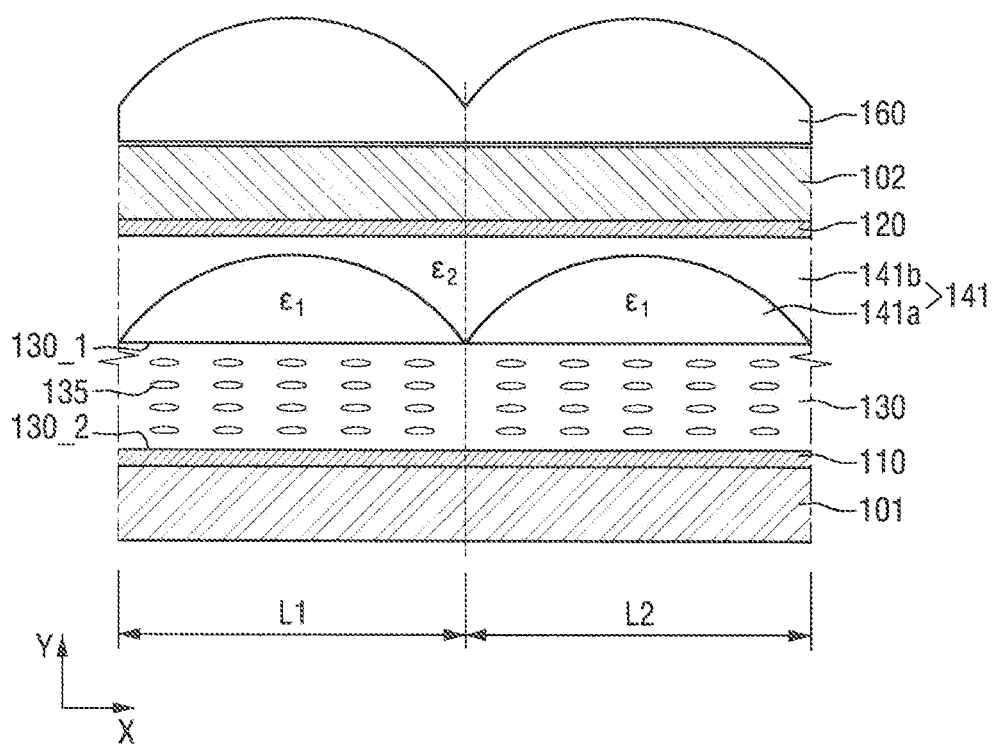

FIG. 32 is a cross-sectional view of a liquid crystal lens 1125 constructed as another exemplary embodiment according to the principles of the present invention. Referring to FIG. 32, the liquid crystal lens 1125 constructed as the current exemplary embodiment is different from the liquid crystal lens 1110 constructed as the exemplary embodiment of FIG. 14 in that an optical lens 160 is further formed on a second electrode 120, specifically, on a second substrate 102. That is, the liquid crystal lens 1125 constructed as the current exemplary embodiment is formed by stacking the optical lens 160 whose cross section is shaped like a convex lens on the liquid crystal lens 1110 of FIG. 14.

Unit lenses of the optical lens 160 may be arranged with substantially the same pitch as unit patterns of the first sub-dielectric layer 141a. Light modulation characteristics of the optical lens 160 may be combined with those of a GRIN lens structure realized by a liquid crystal layer 130, etc. to modulate an optical path. For example, when the GRIN lens exhibits light-concentrating characteristics, the convex lens (i.e., optical lens 160) may make a focal length shorter. When the GRIN lens exhibits light-diverging characteristics, light-concentrating characteristics of the convex lens 160 may offset the light-diverging characteristics of the GRIN lens, thereby lessening the degree of light divergence or concentration. Furthermore, a path of light diverged by the GRIN lens may be changed such that the light propagates straight by controlling the divergence and concentration of the light to be offset accurately by each other. When the optical lens 160 is a concave lens, the opposite effect may obviously be brought about.

To control light in more diverse ways, the size or pitch of each unit lens of the optical lens 160 may be designed to be different from that of each unit pattern of the first sub-dielectric layer 141a. In some other embodiments according to the principles of the present invention, the optical lens can be disposed under the first electrode 110, for example, under a first substrate 101.

Figure 33:
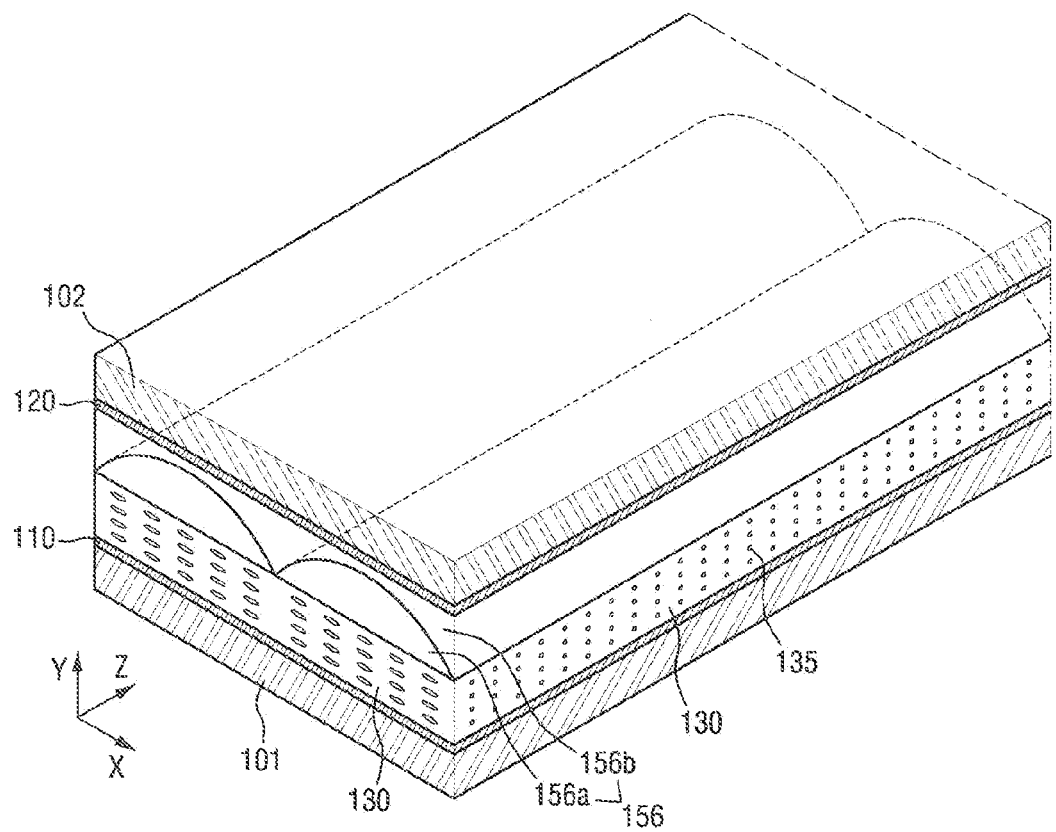

FIG. 33 is a perspective view of a liquid crystal lens 1127 constructed as another exemplary embodiment according to the principles of the present invention. In the liquid crystal lens 1127 constructed as the exemplary embodiment of FIG. 33, a dielectric layer 156 maintains substantially the same pattern along a third direction Z perpendicular to a first direction X and a second direction Y. That is, a first sub-dielectric layer 156a is formed as a lenticular-type layer extending along the third direction Z. Thus, like a lenticular lens, the liquid crystal lens 1127 can maintain uniform light modulation characteristics along the third direction Z. Undescribed reference numeral 156b indicates a second sub-dielectric layer.

Figure 34:
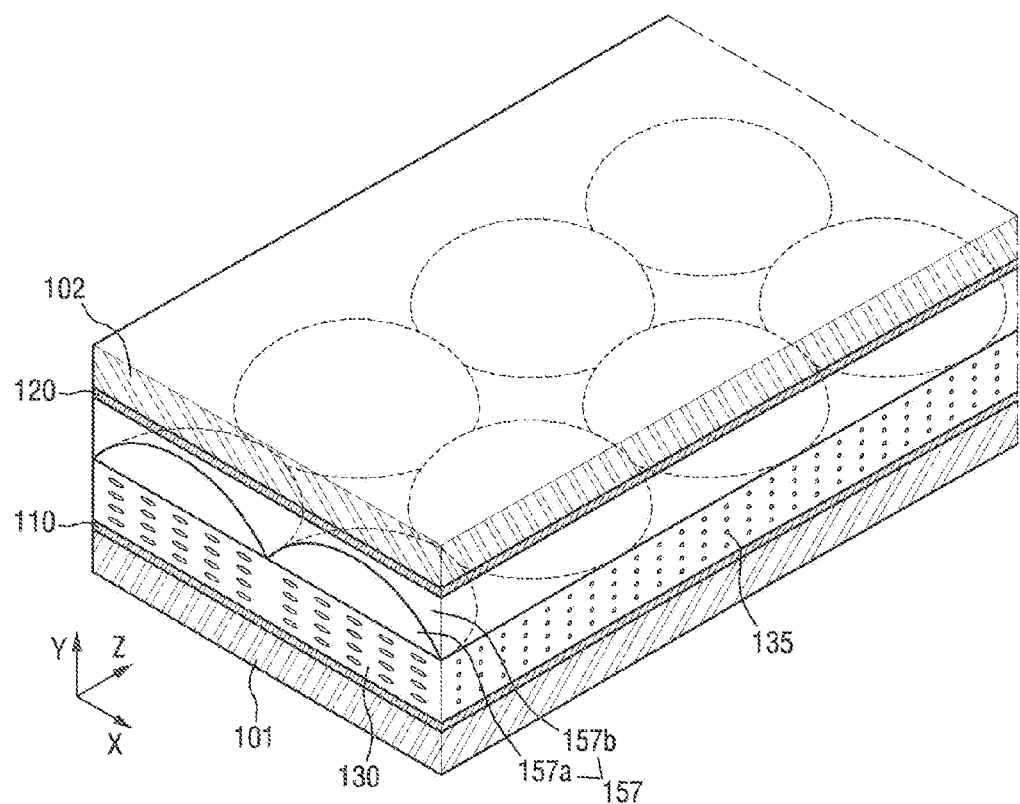

FIG. 34 is a perspective view of a liquid crystal lens 1128 constructed as another exemplary embodiment according to the principles of the present invention. In the liquid crystal lens 1128 constructed as the exemplary embodiment of FIG. 34, a dielectric layer 157 has different patterns along a third direction Z perpendicular to a first direction X and a second direction Y. That is, in the current exemplary embodiment, a plurality of unit patterns are arranged also along the third direction Z. A first sub-dielectric layer 157a is formed as a microlens-type layer. Therefore, it can be understood that the first sub-dielectric layer 157a exhibits light modulation characteristics similar to those of a microlens. Undescribed reference numeral 157b indicates a second sub-dielectric layer.

The exemplary embodiments of FIGS. 33 and 34 can be combined with various embodiments described above with reference to the cross-sectional views.

The above-described liquid crystal lenses can form a display, together with the light providing apparatus 20 as described above with reference to FIG. 1. In addition, since the liquid crystal lenses can freely change and control an optical path, they can be applied to various devices that use light, such as solar cells, image sensors, etc.

Hereinafter, a specific example of a liquid crystal 2D/3D switchable display using both a liquid crystal lens and a display panel will be described in detail.

Figure 35:
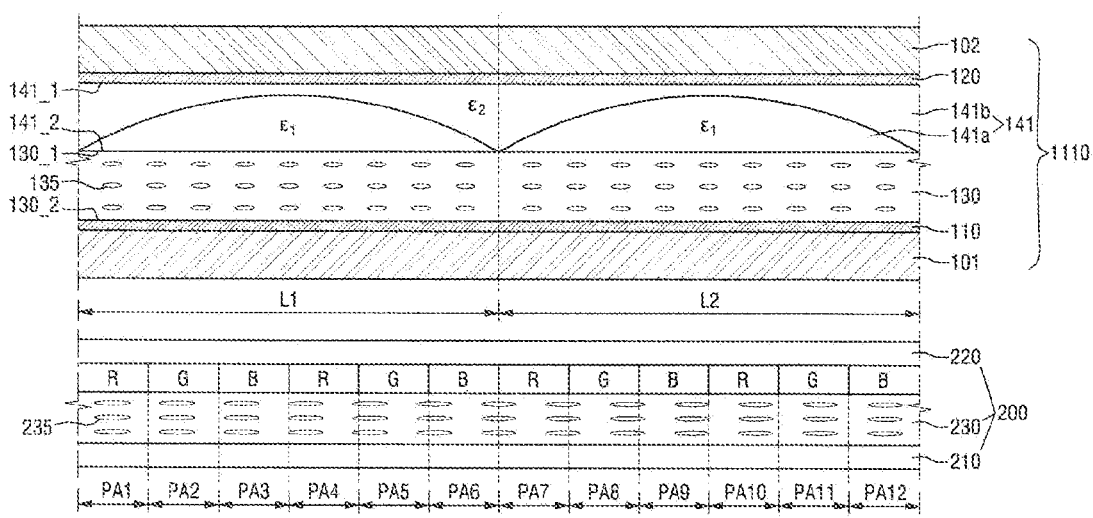
FIG. 35 is a cross-sectional view of a display constructed as an exemplary embodiment according to the principles of the present invention.
Figure 36:
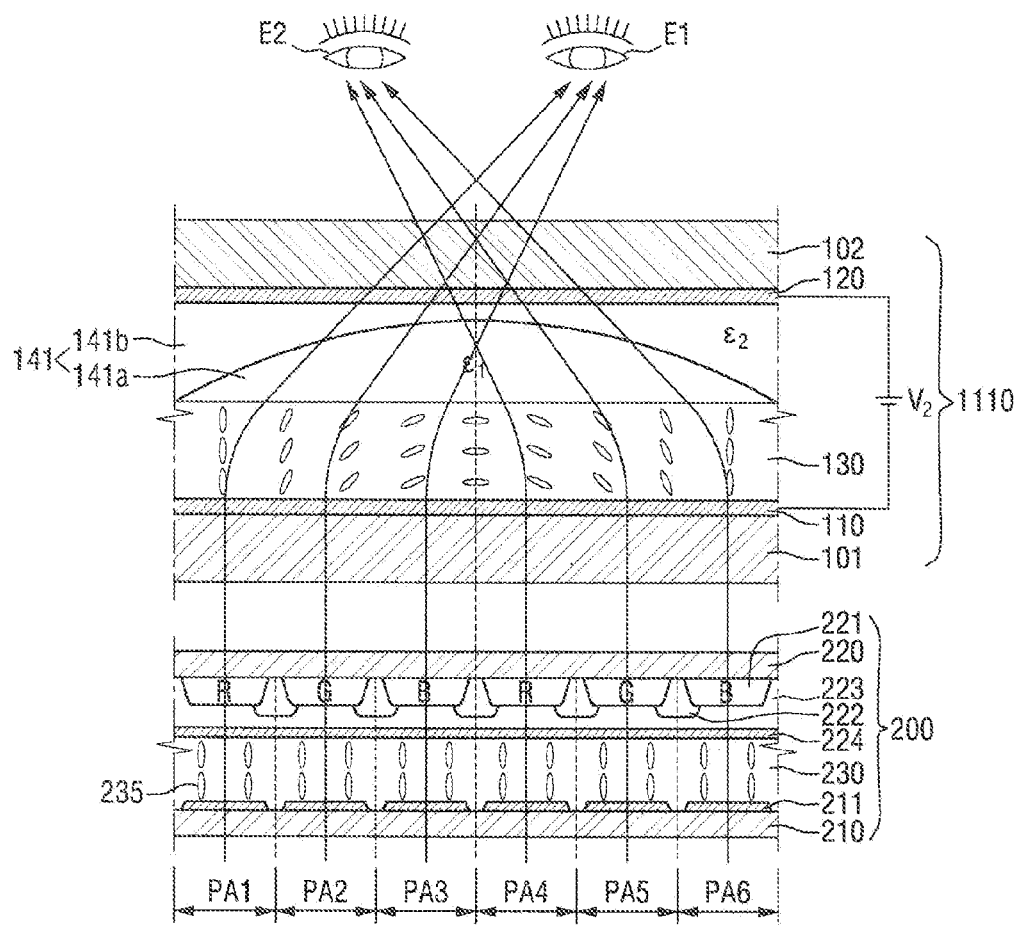
FIG. 36 is a cross-sectional view illustrating the operation of the display of FIG. 35 in a second mode.

FIG. 35 is a cross-sectional view of a display 300 constructed as an exemplary embodiment according to the principles of the present invention. FIG. 36 is a cross-sectional view illustrating the operation of the display 300 of FIG. 35 in a second mode. In FIGS. 35 and 36, the liquid crystal lens 1110 constructed as the exemplary embodiment of FIG. 14 is employed as a liquid crystal lens, and a liquid crystal display panel is employed as a light providing apparatus.

Referring to FIGS. 35 and 36, the display 300 constructed as the current exemplary embodiment includes a liquid crystal display panel 200 and a liquid crystal lens 1110.

The liquid crystal display panel 200 includes a lower substrate 210 and an upper substrate 220 which face each other and a liquid crystal molecule layer 230 which is interposed between the lower and upper substrates 210 and 220.

A plurality of pixel electrodes 211 are formed on the lower substrate 210 respectively in a plurality of pixel regions PA1 through PA12 arranged in a matrix. Each of the pixel electrodes 211 is connected to a switching device such as a thin-film transistor and receives a pixel voltage individually from the switching device.

A common electrode 224 is disposed under the upper substrate 220 to face the pixel electrodes 211. Red (R), green (G), and blue (B) color filters 221 may be disposed on the upper substrate 220 to correspond to the pixel regions PA1 through PA12, respectively. A black matrix 222 may be formed at boundaries between the pixel regions PA1 through PA12. A planarization film 223 may be interposed between the color filters 221 and the common electrode 224.

The liquid crystal molecule layer 230 is interposed between the lower substrate 210 and the upper substrate 220. Liquid crystal molecules 235 of the liquid crystal molecule layer 230 are rotated by an electric field formed between the pixel electrodes 211 and the common electrode 224 to control the transmittance of the liquid crystal display panel 200.

A polarizing plate (not shown) may be attached to an outer surface of each of the lower substrate 210 and the upper substrate 220. In some embodiments, a polarizing plate (not shown) may also be attached to an outer surface of a first substrate 101 of the liquid crystal lens 1110. In this case, the polarizing plate on the upper substrate 220 can be omitted.

A backlight assembly (not shown) may be disposed under the liquid crystal display panel 200.

The liquid crystal lens 1110 is disposed above the liquid crystal display panel 200. In the drawings, the liquid crystal lens 1110 is separated from the liquid crystal display panel 200. However, the present invention is not limited thereto, and the liquid crystal lens 1110 can be attached to the liquid crystal display panel 200.

Unit lens sections L1 and L2 of the liquid crystal lens 1110 may be arranged to correspond to the pixel regions PA1 through PA12 of the liquid crystal display panel 200. In FIG. 35, six pixel regions correspond to one unit lens section. That is, six pixel regions of R, G, B, R, G, and B are arranged within a width of one unit lens section.

In this display 300, if the liquid crystal lens 1110 is driven in a first mode, the display 300 may display a 2D image since the liquid crystal lens 1110 does not particularly modulate an optical path. On the other hand, if the liquid crystal lens 1110 is driven in the second mode, the display 300 may display a 3D image, which will be described in greater detail with reference to FIG. 36.

FIG. 36 is a cross-sectional view illustrating the operation of the display 300 of FIG. 35 in the second mode. Referring to FIG. 36, optical characteristics of the liquid crystal lens 1110 in the second mode are similar to those of a convex lens, as described above with reference to FIGS. 14 and 15. Therefore, paths of rays of light incident on each unit lens section L1 or L2 from three pixel regions (R, G and B) arranged to the left of a center of the corresponding unit lens section L1 or L2 are changed as if the rays of light passed through a left region of a convex lens. Accordingly, the rays of light bend to the right. On the other hand, paths of rays of light incident on each unit lens section L1 or L2 from three pixel regions (R, G and B) arranged to the right of the center of the corresponding unit lens section L1 or L2 is changed as if the rays of light passed through a right region of the convex lens. Accordingly, the rays of light bend to the left. When the above rays of light are input to a left eye E1 and a right eye E2 of a viewer, the viewer may perceive a 3D image.

In the exemplary embodiments of FIGS. 35 and 36, six pixel regions are arranged within the width of one unit lens section. However, more than six pixel regions can also be arranged within the width of one unit lens section. In this case, a multi-view 3D image can be displayed. In addition, since a focal length of the liquid crystal lens 1110 can be changed by controlling voltages applied to a first electrode and a second electrode of the liquid crystal lens 1110 as described above, a distance to a point of view at which a 3D image is viewable can be controlled. For example, when a viewer activates a viewpoint switching mode of the display 300 using a remote control, the voltages applied to the first and second electrodes of the liquid crystal lens 1110 may be changed sequentially, thereby moving the point of view forward or backward. In this way, a point of view at which a 3D image is viewable can be found conveniently.

In some other embodiments according to the principles of the present invention, a common voltage applied to the common electrode 224 of the liquid crystal display panel 200 may be the same as a first voltage applied to the first electrode of the liquid crystal lens 1110 or a second voltage applied to the second electrode. In this case, a driving circuit can be simplified.

In addition, in some other embodiments according to the principles of the present invention, either of the upper substrate 220 of the liquid crystal display panel 200 and the first substrate 101 of the liquid crystal lens 1110 can also play the role of the other one. Therefore, any one of the upper substrate 220 of the liquid crystal display panel 200 and the first substrate 101 of the liquid crystal lens 1110 can be omitted. Further, either of the common electrode 224 of the liquid crystal display panel 200 and the first electrode of the liquid crystal lens 1110 can also play the role of the other one, and thus any one of them can be omitted.

In the exemplary embodiments of FIGS. 35 and 36, the liquid crystal display panel 200 is employed as the light providing apparatus. However, any one of an OLED, an LED, an inorganic EL, an FED, an SED, a PDP, a CRT, and an EPD can also be employed as described above. Since an embodiment for this case can be very easily inferred from the embodiments of FIGS. 35 and 36 by those of ordinary skill in the part, a detailed description thereof will be omitted in order to avoid ambiguous interpretation of the present invention.

In the exemplary embodiments of FIGS. 35 and 36, the liquid crystal lens 1110 constructed as the exemplary embodiment of FIG. 14 is employed as the liquid crystal lens 1110. However, it is obvious that liquid crystal lenses constructed as various embodiments according to the principles of the present invention can also be employed.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A liquid crystal lens, comprising:
a first electrode and a second electrode facing each other;
a liquid crystal layer interposed between the first electrode and the second electrode and having flat top and bottom surfaces; and
a dielectric layer interposed between the second electrode and the liquid crystal layer,
the dielectric layer comprises a section in which capacitance between top and bottom surfaces of the dielectric layer changes along a first direction parallel to one of the flat top and bottom surfaces of the liquid crystal layer,
the dielectric layer including a dielectric layer medium containing dopants, the capacitance of the dielectric layer is controlled by a dielectric constant of the dopants, content of the dopants, or distribution of the dopants.

2. The liquid crystal lens of claim 1, wherein distribution of the capacitance between the top and bottom surfaces of the dielectric layer along the first direction comprises a parabola which bulges upward or downward.

3. The liquid crystal lens of claim 1, wherein the top and bottom surfaces of the dielectric layer are flat.

4. The liquid crystal lens of claim 1, further comprising a first unit lens section which exhibits first light modulation characteristics and a second unit lens section which exhibits second light modulation characteristics.

5. The liquid crystal lens of claim 4, wherein the first light modulation characteristics are the same as the second light modulation characteristics.

6. The liquid crystal lens of claim 4, further comprising a plurality of unit lens sections, wherein the capacitance between the top and bottom surfaces of the dielectric layer changes along the first direction in each unit lens section.

7. The liquid crystal lens of claim 6, wherein the plurality of unit lens sections comprise a first unit section and a second unit section, and wherein the capacitance in the first unit section is equal to the capacitance in the second unit section L2 at the corresponding position along the first direction.

8. The liquid crystal lens of claim 6, wherein when different voltages are applied to the first electrode and the second electrode, the liquid crystal layer of each unit lens section forms a gradient index (GRIN) lens structure.

9. The liquid crystal lens of claim 1, wherein each of the first electrode and the second electrode is a whole-surface electrode.

10. The liquid crystal lens of claim 1, wherein the first electrode and the second electrode are parallel to each other.

11. The liquid crystal lens of claim 1, wherein the dopants are distributed with a different density at each position along the first direction within the dielectric layer medium.

12. A liquid crystal lens, comprising:
a first electrode and a second electrode facing each other;
a liquid crystal layer interposed between the first electrode and the second electrode and having flat top and bottom surfaces; and
a dielectric layer interposed between the second electrode and the liquid crystal layer, the dielectric layer comprising a first sub-dielectric layer having a first dielectric constant and a second sub-dielectric layer having a second dielectric constant which is different from the first dielectric constant,
the dielectric layer comprises a section in which a height of at least one of the first sub-dielectric layer and the second sub-dielectric layer changes along a first direction parallel to one of the flat top and bottom surfaces of the liquid crystal layer,
wherein the first sub-dielectric layer comprises a plurality of unit patterns connected to each other, and
a cross section of at least one of the unit patterns comprises a curved portion.

13. The liquid crystal lens of claim 12, wherein the sum of a height of the first sub-dielectric layer and a height of the second sub-dielectric layer is constant along the first direction.

14. The liquid crystal lens of claim 12, wherein a refractive index of the first sub-dielectric layer is equal to a refractive index of the second sub-dielectric layer.

15. A liquid crystal lens, comprising:
a first electrode and a second electrode facing each other;

a liquid crystal layer interposed between the first electrode and the second electrode and having flat top and bottom surfaces; and a dielectric layer interposed between the second electrode and the liquid crystal layer, the dielectric layer comprising a first sub-dielectric layer having a first dielectric constant and a second sub-dielectric layer having a second dielectric constant which is different from the first dielectric constant, the dielectric layer comprises a section in which a height of at least one of the first sub-dielectric layer and the second sub-dielectric layer changes along a first direction parallel to one of the flat top and bottom surfaces of the liquid crystal layer, wherein the first sub-dielectric layer comprises a plurality of unit patterns separated from each other, each unit pattern of the first sub-dielectric layer is surrounded by the second sub-dielectric layer, and at least one of the unit patterns of the first sub-dielectric layer is shaped like a dome, a trapezoid, a convex lens, or a concave lens.

16. The liquid crystal lens of claim 12, wherein top and bottom surfaces of the dielectric layer are flat.

17. The liquid crystal lens of claim 12, wherein each of the first electrode and the second electrode is a whole-surface electrode.

18. The liquid crystal lens of claim 17, wherein the first electrode and the second electrode are parallel to each other.

19. The liquid crystal lens of claim 12, further comprising an optical lens disposed under the first electrode or on the second electrode.

20. A liquid crystal lens, comprising:
a first electrode;
a liquid crystal layer formed on the first electrode and having flat top and bottom surfaces;
a dielectric layer formed on the liquid crystal layer and having a top surface which comprises a curved surface; and
a second electrode conformally formed on the top surface of the dielectric layer.

21. The liquid crystal lens of claim 20, wherein the dielectric layer comprises a plurality of unit patterns connected to each other.

22. The liquid crystal lens of claim 20, wherein each of the first electrode and the second electrode is a whole-surface electrode.

23. A display device, comprising:
a light providing apparatus; and
a liquid crystal lens disposed on the light providing apparatus,
the liquid crystal lens comprises:
a first electrode and a second electrode facing each other;
a liquid crystal layer interposed between the first electrode and the second electrode and having flat top and bottom surfaces; and
a dielectric layer interposed between the second electrode and the liquid crystal layer,
the dielectric layer comprises a section in which capacitance between top and bottom surfaces of the dielectric layer changes along a first direction parallel to one of the flat top and bottom surfaces of the liquid crystal layer.

24. The display device of claim 23, wherein the light providing apparatus comprises a display panel.

25. The display device of claim 24, wherein the display panel is any one of an organic light-emitting diode (OLED), a light-emitting diode (LED), an inorganic electroluminescent display (EL), a field emission display (FED), a surface-conduction electron-emitter display (SED), a plasma display panel (PDP), a cathode ray tube (CRT), a liquid crystal display (LCD), and an electrophoretic display (EPD).

26. The display device of claim 24, wherein the display panel comprises a plurality of pixel regions arranged in a matrix, and the liquid crystal lens comprises a plurality of unit lens sections, wherein the dielectric layer comprises a section in which the capacitance between the top and bottom surfaces of the dielectric layer changes along the first direction in each unit lens section, and two or more pixel regions are arranged within a width of each unit lens section.

27. The display device of claim 26, wherein the plurality of unit lens sections comprise a first unit section and a second unit section, and wherein the capacitance in the first unit section is equal to the capacitance in the second unit section L2 at the corresponding position along the first direction.

28. The display device of claim 23, wherein distribution of the capacitance between the top and bottom surfaces of the dielectric layer along the first direction comprises a parabola which bulges upward or downward.

29. The display device of claim 23, wherein the liquid crystal lens comprises a plurality of unit lens sections, wherein the dielectric layer comprises a section in which the capacitance between the top and bottom surfaces of the dielectric layer changes along the first direction in each unit lens section.

30. A display device, comprising:
a light providing apparatus; and
a liquid crystal lens disposed on the light providing apparatus,
the liquid crystal lens comprises:
a first electrode and a second electrode facing each other;
a liquid crystal layer interposed between the first electrode and the second electrode and having flat top and bottom surfaces; and
a dielectric layer interposed between the second electrode and the liquid crystal layer and comprising a first sub-dielectric layer having a first dielectric constant and a second sub-dielectric layer having a second dielectric constant which is different from the first dielectric constant,
wherein the dielectric layer comprises a section in which the height of at least one of the first sub-dielectric layer and the second sub-dielectric layer changes along the first direction parallel to one of the flat top and bottom surfaces of the liquid crystal layer.

31. The display device of claim 30, wherein the light providing apparatus comprises a display panel.

32. The display device of claim 31, wherein the display panel is any one of an OLED, an LED, an inorganic EL, an FED, an SED, a PDP, a CRT, an LCD, and an EPD.

33. The display device of claim 31, wherein the display panel comprises a plurality of pixel regions arranged in a matrix, and the first sub-dielectric layer comprises a plurality of unit patterns connected to each other, wherein two or more pixel regions are arranged within a width of each unit pattern.

34. The display device of claim 31, wherein the display panel comprises a plurality of pixel regions arranged in a matrix, and the first sub-dielectric layer comprises a plurality of unit patterns separated from each other, wherein two or more pixel regions are arranged in a pitch of each unit pattern.

35. The display device of claim 30, wherein the sum of the height of the first sub-dielectric layer and the height of the second sub-dielectric layer is constant along the first direction.

36. The display device of claim 30, wherein a refractive index of the first sub-dielectric layer is equal to a refractive index of the second sub-dielectric layer.

37. A display device comprising:
a light providing apparatus; and
a liquid crystal lens disposed on the light providing lens,
the liquid crystal lens comprises:
a first electrode;
a liquid crystal layer formed on the first electrode and having flat top and bottom surfaces;
a dielectric layer formed on the liquid crystal layer and having a top surface which comprises a curved surface; and
a second electrode conformally formed on the top surface of the dielectric layer.

38. A liquid crystal lens, comprising:
a first electrode and a second electrode facing each other;
a liquid crystal layer interposed between the first electrode and the second electrode and having flat top and bottom surfaces; and
a dielectric layer interposed between the second electrode and the liquid crystal layer,
the dielectric layer comprises a section in which capacitance between top and bottom surfaces of the dielectric layer changes along a first direction parallel to one of the flat top and bottom surfaces of the liquid crystal layer,
a substrate is not included between the first electrode and the second electrode.

39. A liquid crystal lens, comprising:
a first electrode and a second electrode facing each other;
a liquid crystal layer interposed between the first electrode and the second electrode and having flat top and bottom surfaces; and
a dielectric layer interposed between the second electrode and the liquid crystal layer, the dielectric layer comprising a first sub-dielectric layer having a first dielectric constant and a second sub-dielectric layer having a second dielectric constant which is different from the first dielectric constant,
the dielectric layer comprises a section in which a height of at least one of the first sub-dielectric layer and the second sub-dielectric layer changes along a first direction parallel to one of the flat top and bottom surfaces of the liquid crystal layer,
a substrate is not included between the first electrode and the second electrode.

40. The liquid crystal lens of claim 20, wherein a substrate is not included between the first electrode and the second electrode.

* * * * *